(12) United States Patent
Torii et al.

(10) Patent No.: US 7,400,830 B2
(45) Date of Patent: Jul. 15, 2008

(54) QUALITY MONITORING METHOD AND APPARATUS FOR WAVELENGTH DIVISION MULTIPLEXED OPTICAL SIGNAL AND OPTICAL TRANSMISSION SYSTEM USING THE SAME

(75) Inventors: Kenichi Torii, Arakawa (JP); Takao Naito, Kawasaki (JP); Hiroshi Nakamoto, Kawasaki (JP); Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 628 days.

(21) Appl. No.: 10/806,330

(22) Filed: Mar. 23, 2004

(65) Prior Publication Data

US 2004/0190899 A1 Sep. 30, 2004

(30) Foreign Application Priority Data

Mar. 25, 2003 (JP) ............................. 2003-081779

(51) Int. Cl.
*H04B 10/08* (2006.01)
(52) U.S. Cl. ........................................ 398/34; 398/157
(58) Field of Classification Search .................. 398/26, 398/27, 34, 49, 79, 58, 68, 97, 94, 103, 157
See application file for complete search history.

(56) References Cited

U.S. PATENT DOCUMENTS 5,510,917 A * 4/1996 Corke et al. .................. 398/34

(Continued)

FOREIGN PATENT DOCUMENTS

JP 08-321805 12/1996

(Continued)

OTHER PUBLICATIONS

A. Agata et al., "Bit error characteristics for various degradation factors in optical transmission systems" in Proceedings of 2002 Communication Society Conference of the Institute of Electronics, Information and Communication Engineers (IEICE)/ vol. 2, Japan, Aug. 20, 2002, B-10-77, p. 365.

(Continued)

*Primary Examiner*—Richard Hjerpe
*Assistant Examiner*—Shaheda A Abdin
(74) *Attorney, Agent, or Firm*—Staas & Halsey LLP

(57) ABSTRACT

The present invention has an object to provide a technology for monitoring the quality of a WDM signal light, capable of quickly and accurately judging an occurrence of quality deterioration of signal light and a deterioration factor thereof. To this end, according to a quality monitoring apparatus of WDM signal light of the present invention, a part of the WDM signal light being propagated through an optical transmission path is branched as a monitor light, a signal light of one wavelength contained in the monitor light is selected as a channel to be measured. Then, the frequency of occurrences of bit error for the channel to be measured is repeatedly measured for a plurality of times, and whether or not the signal quality is deteriorated is judged, together with the deterioration factor based on the measurement results, and a control signal light for adjusting the signal light power according to the judgment result is transmitted to the optical transmission path, to achieve the improvement of a characteristic of the WDM signal light.

18 Claims, 15 Drawing Sheets

U.S. PATENT DOCUMENTS

| | | | |
|---|---|---|---|
| 6,556,617 B1 * | 4/2003 | Tsujimoto | 375/141 |
| 6,952,529 B1 * | 10/2005 | Mittal | 398/26 |
| 6,980,737 B1 * | 12/2005 | Anslow et al. | 398/27 |
| 2002/0048062 A1 * | 4/2002 | Sakamoto et al. | 359/124 |
| 2002/0131115 A1 * | 9/2002 | Kasahara | 359/124 |
| 2003/0128979 A1 * | 7/2003 | Kitajima et al. | 398/12 |
| 2004/0052524 A1 * | 3/2004 | Arnold | 398/38 |

FOREIGN PATENT DOCUMENTS

| | | |
|---|---|---|
| JP | 2000-031900 | 1/2000 |
| JP | 2003-069503 | 3/2003 |

OTHER PUBLICATIONS

Japanese Patent Office Action, mailed Oct. 2, 2007 and issued in corresponding Japanese Patent Application No. 2003-081779.

* cited by examiner (a) DETERIORATION FACTOR: ASE NOISE
(b) DETERIORATION FACTOR: SRS
(c) DETERIORATION FACTOR: XPM
(d) DETERIORATION FACTOR: XT
(e) DETERIORATION FACTOR: IFWM

FIG.5
CASE OF NO ADJACENT CHANNEL
(a)
NORMAL STATE
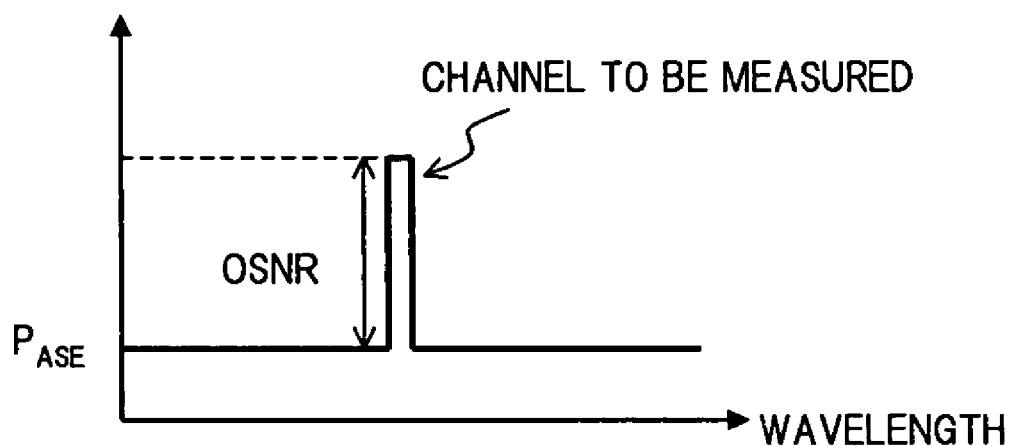
(b)
DETERIORATION FACTOR: ASE
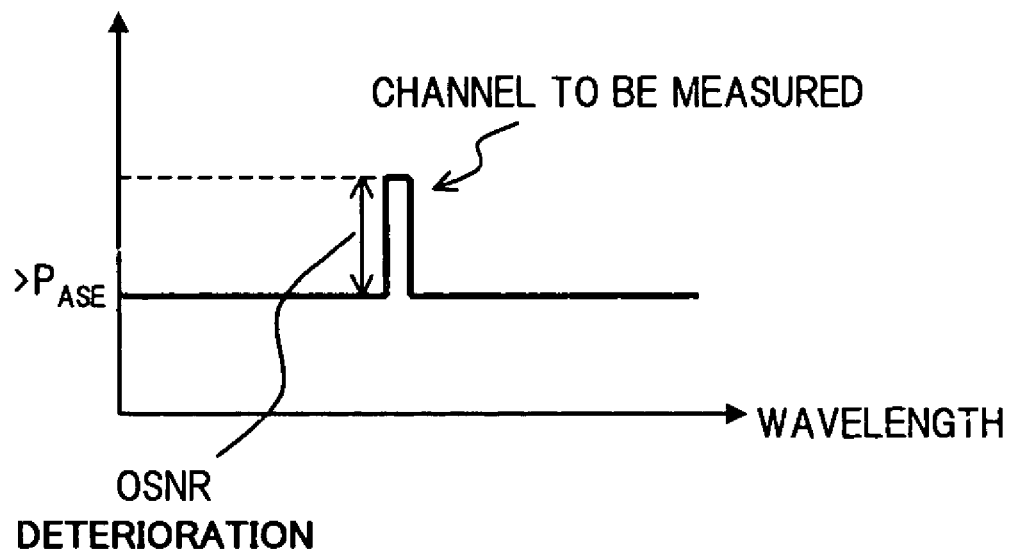

QUALITY MONITORING METHOD AND APPARATUS FOR WAVELENGTH DIVISION MULTIPLEXED OPTICAL SIGNAL AND OPTICAL TRANSMISSION SYSTEM USING THE SAME

BACKGROUND OF THE INVENTION (1) Field of the Invention

The present invention relates to technology for monitoring the quality of wavelength division multiplexed signal light transmitted in optical communications, and more particularly, relates to a method and apparatus for monitoring deterioration of signal quality based on a state of occurrence of bit error and an optical transmission system using the same.

(2) Related Art

Heretofore, in a long distance optical transmission system, an optical signal has been converted into an electrical signal to be transmitted using regenerative repeaters which perform reshaping, retiming, and regenerating. At the present time, however, with the development of optical devices including optical amplifiers and the development of transmission technology including the wavelength division multiplexing (WDM) optical transmission system, it is possible to transmit optical signals of large capacity over a distance of several thousand kilometers without converting them into electrical signals. In addition, in next generation optical transmission networks, it is expected that, by introducing not only optical amplification repeater nodes but also optical add/drop multiplexer (OADM) nodes, optical cross-connect (OXC) nodes, hub (HUB) nodes and the like, photonic networking of mesh topology will be performed.

FIG. 13 is a diagram showing an example of configuration of a conventional optical transmission system using electrical regenerative repeaters. In the optical transmission system of FIG. 13, a plurality of optical transmission/reception sections 100 are connected with each other by an optical transmission path 101 on which regenerative repeaters 102 are arranged at required intervals. The most direct technique for monitoring signal quality in such a conventional optical transmission system is a method of monitoring a bit error rate (BER) at an electrical stage when performing the electrical regenerative repeating in each regenerative repeater 102. Specifically, in SONET/SDH system optical transmission networks currently in practical use, it is possible to estimate the bit error rate utilizing an error detection bit (i.e., B1, B2 byte) in the overhead of transmission data and therefore, it is possible to obtain an amount of deterioration of signal quality at each link connecting optical transmission/reception sections 100. In such a network, if the signal quality is significantly deteriorated, a measure to switch the path or the like is adopted. If the deterioration is in an allowable range, a simple measure to adjust the signal light power or the like is adopted. Further, in a system adopting error correction technology, it is also possible to measure the frequency of error corrections to estimate the bit error rate. Further, a method of estimating the Q-value from a signal light waveform is also known.

Other than the above methods requiring the measurement of the bit error rate, for example, as shown in FIG. 14, there is a method in which an optical branching device 106 is provided on an optical transmission path 105 between an optical transmission section 103 and an optical reception section 104, the signal quality is monitored by extracting a part of WDM optical signal to measure the optical spectrum of the extracted optical signal by an optical spectrum analyzer 107. With this method, the signal quality is estimated based on the optical power level of the optical signal at each wavelength.

Further, as described above, at the present, the long distance transmission is possible without converting an optical signal into an electrical signal. Examples of configuration of such an optical transmission system are shown in (a) to (c) of FIG. 15.

The system of (a) of FIG. 15 is a long distance transmission system using only optical amplification repeater nodes $N_1$ as a plurality of repeater nodes existing on an optical transmission path 202 connecting an optical transmission section 200 and an optical reception section 201. A signal light is transmitted just as in a state of light from the optical transmission section 200 to the optical reception section 201. Each of the optical amplification repeater nodes $N_1$ usually has an optical amplification function and a wavelength dispersion compensation function. Further, the system of (b) of FIG. 15 adopts a compensation node $N_2$ in addition to the above optical amplification repeater nodes $N_1$. If the WDM signal light is transmitted just as in the state of light over a long distance, depending on the accumulation of gain deviation in the optical amplifiers or wavelength dispersion, there occurs a channel in which a transmission characteristic required in the system cannot be satisfied. To suppress the occurrence of such a channel to enable the long distance transmission, as shown in (b) of FIG. 15, it becomes necessary to adopt the compensation node $N_2$ having not only the optical amplification function and the dispersion compensation function, but also a gain equalization function, a dispersion slope compensation function or the like, corresponding to required compensation intervals. Further, as shown in (c) of FIG. 15, by using a plurality of compensation nodes $N_2$, it becomes possible to realize an ultra-long distance optical transmission system.

Further, in the next generation optical transmission system as shown in FIG. 16 for example, in addition to the optical amplification repeater nodes $N_1$ and compensation nodes $N_2$, hub nodes $N_3$ each having an optical path switching function are adopted to realize an optical network different from the conventional point-to-point transmission.

When the monitoring of signal quality is introduced to a system in which a WDM signal is transmitted for a long distance just as in the state of light as shown in FIG. 15 or FIG. 16, it is possible to use, for example, an optical branching device to extract a part of the WDM signal light at each node and utilize an optical spectrum analyzer to monitor the signal quality as shown in the above-mentioned FIG. 14, or to convert the extracted WDM signal light into an electrical signal, and then measure the bit error rate to monitor the signal quality (refer to Japanese Unexamined Patent Publication No. 8-321805 and Japanese Unexamined Patent Publication No. 2000-31900).

However, there are problems in the above conventional technology for monitoring the signal quality: (a) an increase of the time required for improvement of the signal quality and the complication of the process required for maintenance of the signal quality; and (b) the reduction in the measurement accuracy of the signal quality.

First, the above problem (a) will be described specifically. In general, as one method for setting a wavelength path (optical path) in a network, there is a method of determining, at the time of installing the network, the types of wavelength paths which can be set for combinations of a certain transmission node and a certain reception node, and when a request for setting a wavelength path is issued at the in-service time, selecting to use a wavelength path not being used among the wavelength paths determined at the time of installation. Another method is for actually transmitting a light of candidate wavelength in a candidate route when a request for setting a wavelength path is issued at the in-service time, and after confirming that the sufficient signal quality is ensured, transmitting signal light carrying actual data. The latter method has an advantage of enabling the construction of a more flexible network.

However, in a system using the latter method, if the wavelength spacing is narrowed or the signal light wavelength bandwidth is extended by increasing the wavelengths, there is a possibility that the quality of transmitted signal light is deteriorated, due to a nonlinear effect which never occurred in previous operation time, such as, cross-phase modulation (XPM), intra-channel four-wave mixing (IFWM), stimulated Raman scattering (SRS) or the like. When the signal quality no longer satisfies a value required by the system, the working becomes necessary for improving characteristics, such as, specifying a deterioration factor of the signal quality and then specifying the transmission block requiring countermeasures. In practice, a system manager has to achieve the improvement of the characteristic while repeating a trial and error process. Such working by the system manager has a high possibility of requiring a long time until the suitable setting is performed, causing a major demerit to a communication common carrier using the system.

Further, for example, in the case where a deterioration rate of the signal quality has been increased caused by the deterioration with age of system components such as the optical transmission path, it is desirable to quickly improve the characteristic using a simple method other than the switching of the wavelength path, while the signal quality still satisfies an allowable value of the system. One of the most effective methods is to adjust the optical power of each wavelength in the WDM signal light. However, in a system adopting optical add/drop multiplexer nodes, optical cross-connect nodes, or hub nodes, there is a possibility that since the quality deterioration factor of the signal light of each wavelength cannot be specified, the location where the power of the signal light is to be adjusted and a reset value of the signal light power will become unclear. Such a circumstance is particularly remarkable in a long distance transmission system and a network configuration system. Accordingly, there is caused a problem in that a long time is required until the suitable setting is performed or the process required for maintaining the signal quality is complicated.

Next, the above problem (b) will be described specifically. The conventional technology for monitoring the signal quality as described in the above requires a long time for measuring the bit error rate when directly measuring it. However, a relatively high speed process becomes possible by adopting a method of measuring the optical spectrum to investigate a signal light power to noise light power ratio (OSNR) or a method of estimating the signal quality from information of the signal light power of each channel. In monitoring by such optical spectrum measurement, however, high accurate measurement of the noise light power becomes difficult in a high density WDM transmission system with signal light wavelength spacing of 50 GHz or less. Therefore, it is difficult to expect accurate estimation of bit error rate, resulting in a problem in terms of measurement accuracy.

SUMMARY OF THE INVENTION

The present invention has been accomplished in view of the above problems and has an object to provide a quality monitoring method and apparatus of WDM signal light, capable of accurately judging in a short time an occurrence of quality deterioration of signal light and a quality deterioration factor, and an optical transmission system using the same.

To achieve the above object, according to the present invention, there is provided a quality monitoring method of WDM signal light, for monitoring the quality of WDM signal light transmitted via an optical transmission path, comprising: branching a part of the WDM signal light being propagated through the optical transmission path as a monitor light; selecting, as an object to be measured, a signal light of one wavelength from the signal lights of a plurality of wavelengths contained in the branched monitor light; repeatedly measuring for a plurality of times the frequency of occurrences of bit error in a previously set time for the selected signal light to be measured; judging based on the measurement results as to whether or not the signal light to be measured is deteriorated in the quality thereof, together with a deterioration factor; and outputting the judgment result as monitoring information.

According to the quality monitoring method of WDM signal light as described above, the frequency of occurrences of bit error in the previously set time is repeatedly measured for the plurality of times for the signal light of each wavelength in the WDM signal light being propagated through the optical transmission path, it is judged based on the measurement results whether or not the signal light to be measured is deteriorated in the quality thereof, and, in the case where the quality of the signal light is deteriorated, the deterioration factor is judged. Therefore, even when the signal quality is deteriorated during the system operation, it becomes possible to accurately judge in a short time the deterioration occurrence and the deterioration factor, to obtain the monitoring information of the signal quality. Thus, it becomes possible to reduce a burden on the working for improving characteristics, which had been performed by a system manager and the like while repeating a trial and error process in the past.

Further, in the above quality monitoring method, it is also possible to generate a control signal for adjusting the power of the signal light to be measured according to the monitoring information, to transmit this control signal to the optical transmission path. Thus, since the adjustment of the signal light power reflecting the judgment result of the deterioration factor is performed in accordance with the control signal, it becomes possible to quickly and reliably improve the characteristic of the WDM signal light.

Further, as a specific content of the above quality monitoring method, the judgment whether the signal light to be measured is deteriorated in the quality thereof may be performed based on a maximum value in the frequency of occurrences of bit error repeatedly measured for the plurality of times. Further, in the case where it is judged that the signal light to be measured is deteriorated in the quality thereof, the constitution may be such that it is judged whether or not signal lights exist on wavelength grids adjacent to the signal light to be measured, and when the signal lights exist on the adjacent wavelength grids, the frequency of occurrences of bit error in the previously set time is repeatedly measured for the plurality of times for the signal lights on the adjacent grids, and the deterioration factor of the signal light to be measured is judged based on the measurement results. Thus, it becomes possible to easily judge the occurrence of deterioration of signal quality and the deterioration factor by a simple process.

Other objects, features and advantages of the present invention will become clear from the following description of the embodiments, in conjunction with the appended drawings.

BRIEF DESCRIPTION OF THE DRAWINGS

FIGS. 5(a) and 5(b) are pattern diagrams for explaining the relationship of the deterioration factor and signal light power for when there are no adjacent channels;

DESCRIPTION OF THE PREFERRED EMBODIMENTS

Hereunder is a description of embodiments of the present invention with reference to the drawings. The same reference symbols are used to the same or similar parts throughout all the drawings.

Figure 1:
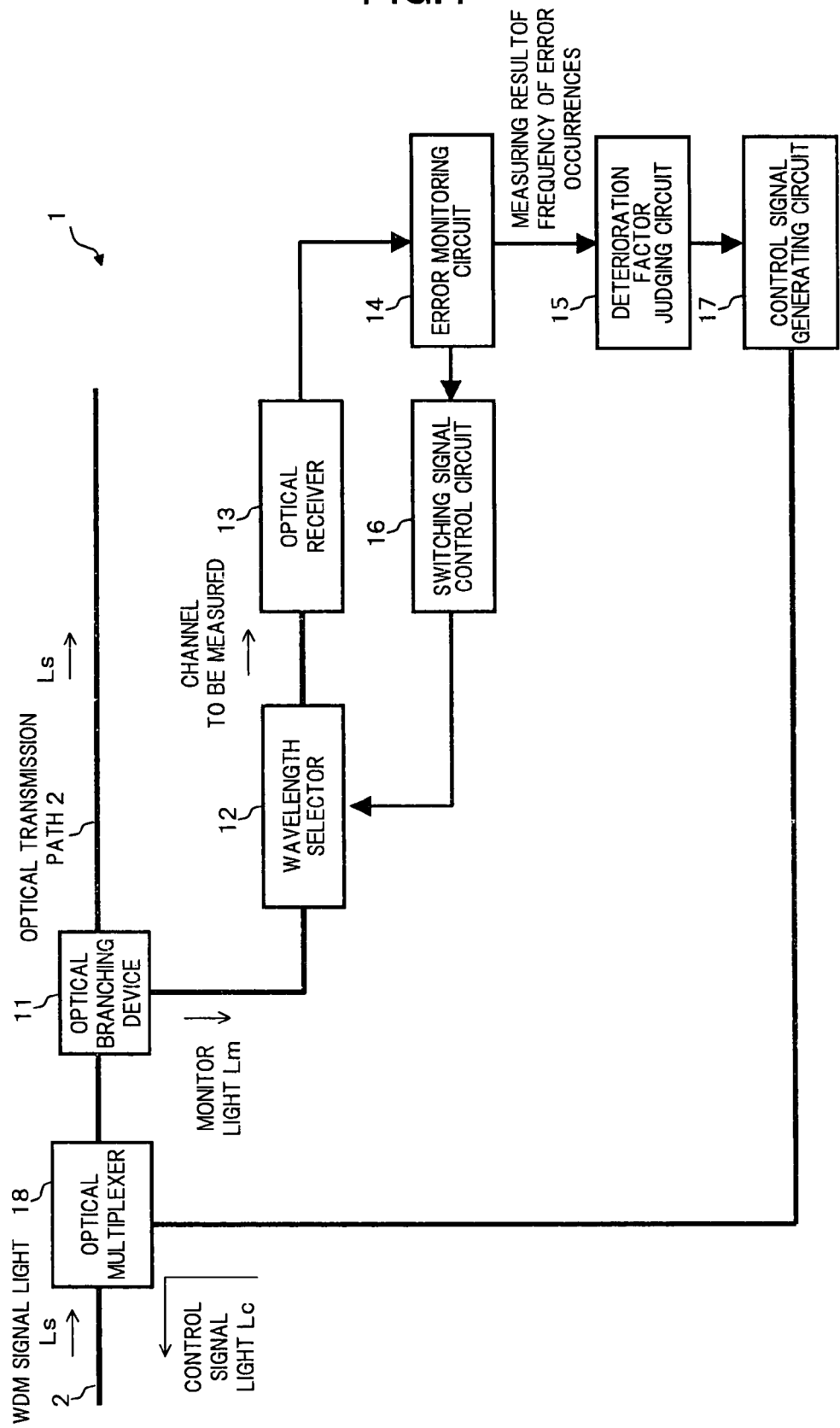
FIG. 1 is a block diagram of an apparatus according to a first embodiment of the present invention.

FIG. 1 is a block diagram of a first embodiment of an apparatus to which a method of monitoring the signal quality according to the present invention is applied.

In FIG. 1, the apparatus 1 is provided with for example an optical branching device 11 serving as an optical branching section, a wavelength selector 12 serving as a wavelength selecting unit, an optical receiver 13 and error monitoring circuit 14 serving as a bit error measuring section, a deterioration factor judging circuit 15 serving as a deterioration factor judging section, a switching signal control circuit 16 serving as a switching control section, a control signal generating circuit 17 serving as a control signal generating section, and an optical multiplexer 18 serving as an optical multiplexing section. This apparatus 1 is applied to a required repeater node and the like in an optical transmission system as shown in the above FIG. 16.

The optical branching device 11 branches a part of a WDM signal light Ls being propagated through an optical transmission path 2 connected with the apparatus 1 as a monitor light Lm, to output it to the wavelength selector 12. The WDM signal light Ls branched by this optical branching device 11 is a light containing a plurality of signal lights of different wavelengths (channels).

The wavelength selector 12 selects a signal light of wavelength to be measured (hereinafter referred to as "channel to be measured") from the monitor light Lm branched by the optical branching device 11, to send it to the optical receiver 13. The channel to be measured selected in the wavelength selector 12 is controlled in accordance with a switching signal output from the switching signal control circuit 16.

Figure 2:
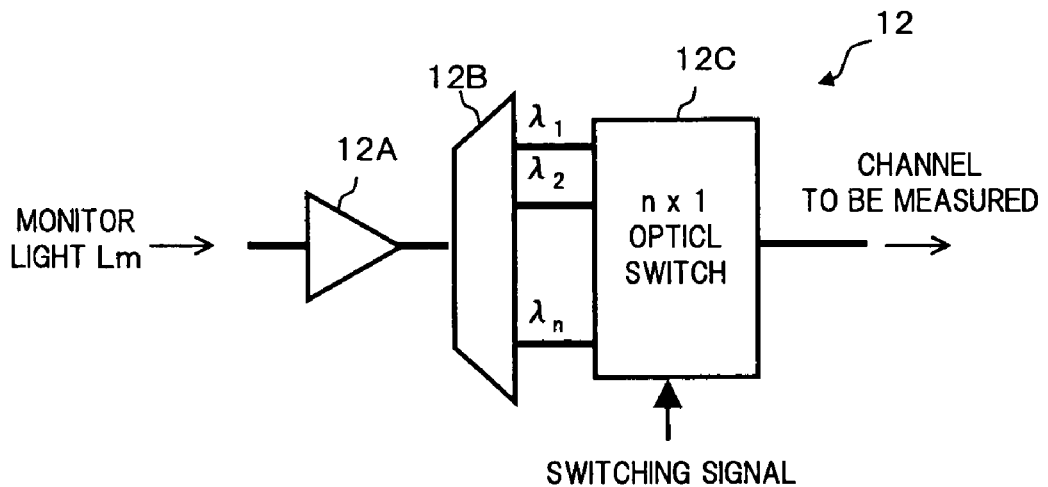
FIG. 2 is a block diagram of a specific example of a wavelength selector used in the first embodiment.
Figure 3:
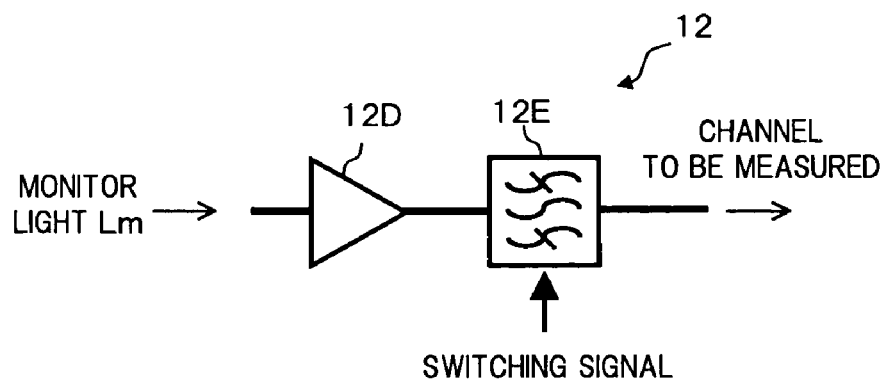
FIG. 3 is a block diagram of another specific example of the wavelength selector used in the first embodiment.
Figure 4:
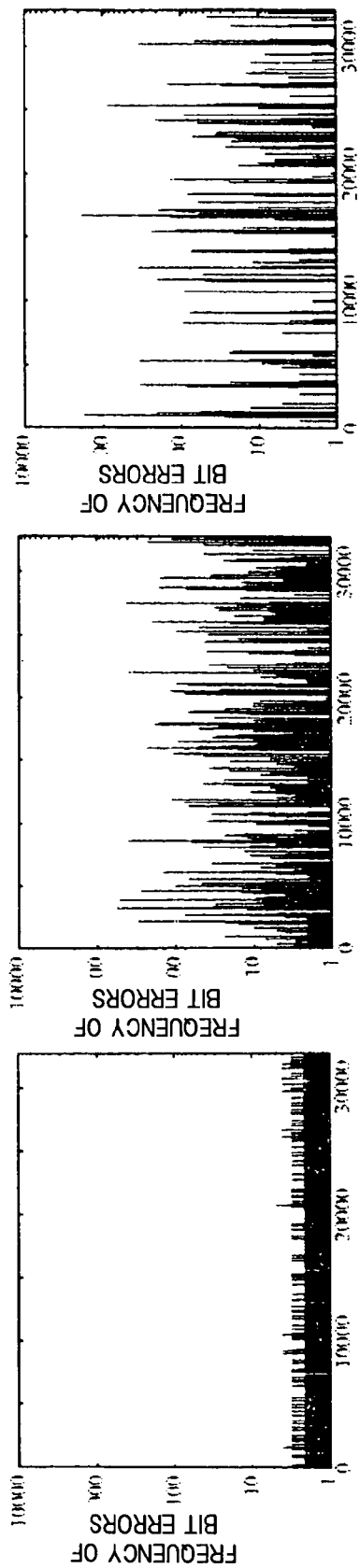
FIGS. 4(a) to 4(e) are diagrams for explaining the relationship between the distribution of occurrence of bit error and a deterioration factor of transmission characteristic.

FIG. 2 and FIG. 3 show examples of specific configuration of the wavelength selector 12. In the configuration example of FIG. 2, the wavelength selector 12 comprises an optical amplifier 12A, an optical demultiplexer 12B, and an optical switch 12C. In this wavelength selector 12, the monitor light Lm from the optical branching device 11 is amplified by the optical amplifier 12A and input to the optical demultiplexer 12B using an arrayed waveguide grating (AWG) and the like. The signal lights output from respective output ports of the optical demultiplexer 12B are input to an n×1 (n is the number of input ports) optical switch 12C having at least the same number of input ports as the number of output ports of the optical demultiplexer 12B. The optical switch 12C selects the signal light of wavelength to be measured in accordance with the switching signal, to output it to the optical receiver 13. Further, in the configuration example of FIG. 3, the wavelength selector 12 comprises an optical amplifier 12D and a variable optical filter 12E. In this wavelength selector 12, the monitor light Lm from the optical branching device 11 is amplified by the optical amplifier 12D, to be input to the optical filter 12E using a band-pass filter with a variable pass band having one input port and one output port. In the variable optical filter 12E, the band pass thereof is controlled by the switching signal, so that the signal light of wavelength to be measured is extracted, to be output to the optical receiver 13.

The optical receiver 13 converts the channel to be measured selected by the wavelength selector 12 into an electrical signal, to output it to the error monitoring circuit 14.

The error monitoring circuit 14 repeatedly measures the frequency of occurrences of bit error in a previously set time (hereinafter referred to as "frequency of error occurrences") for the output signal from the optical receiver 13, for a required number of times, outputs the measurement results to the deterioration factor judging circuit 15, and also outputs a signal notifying the end of measurement of the frequency of error occurrences for the channel to be measured to the switching signal control circuit 16.

The deterioration factor judging circuit 15 judges a deterioration factor of the signal quality based on the time-wise fluctuation of the frequency of error occurrences measured in the error monitoring circuit 14, to output the judgment result to the control signal generating circuit 17. Note, a specific method of judging the deterioration factor in the deterioration factor judging circuit 15 will be described later.

The switching signal control circuit 16 generates a signal for switching the channel to be measured in accordance with the output signal from the error monitoring circuit 14, to output the switching signal to the wavelength selector 12.

The control signal generating circuit 17 generates a control signal light Lc for improving a transmission characteristic of the WDM signal light according to the judgment result in the deterioration factor judging circuit 15, to output it to the optical multiplexer 18.

The optical multiplexer 18 sends the control signal light Lc from the control signal generating circuit 17 to the optical transmission path 2 on a former stage side, to transmit the control signal light Lc to another node on the optical transmission path 2. The above control signal light Lc is transmitted to another apparatus, by utilizing a dedicated wavelength channel prepared for propagating the control signal light Lc through the system to which the apparatus 1 is applied.

Next, an operation of the first embodiment will be described.

In the apparatus 1 of this configuration, the WDM signal light Ls being propagated through the optical transmission path 2 passes through the optical multiplexer 18, and then is input to the optical branching device 11. In this optical branching device 11, the majority of the power of WDM signal light Ls is output to a port connected with the optical transmission path 2 on the latter stage side in its inherent state, but a part thereof is output to a branching port of the optical branching device 11 as the monitor light Lm, to be input to the wavelength selector 12. In the wavelength selector 12, only the channel to be measured is selected from the monitor light Lm in accordance with the switching signal transmitted from the switching signal control circuit 16, to be output to the optical receiver 13. The channel to be measured received by the optical receiver 13 is converted into an electrical signal the level of which is changed depending on the power of channel, to be sent to the error monitoring circuit 14.

In the error monitoring circuit 14, the frequency of error occurrences for the output signal from the optical receiver 13 is measured. The frequency of error occurrences is measured utilizing, for example, an error correction code (forward error correction, FEC) included in the channel to be measured. In this case, a measurement time per one occurrence of error is set to be a time equal to or longer than one frame length of the error correction code. Specifically, when the present apparatus is applied to an optical transmission system having a transmission rate per channel of 10 Gbps (gigabit per second) for example, if the measurement time per one occurrence of error is set to 1 ms (millisecond), the number of bits judged in this measurement time becomes 10 Mbits (megabits). If it is assumed that the bit error rate allowed in the above optical transmission system is $10^{-15}$ and the error correction code with a coding gain of 8.8 dB is adopted, the bit error rate allowed on a stage before the error correction becomes $2 \times 10^{-3}$. Accordingly, the maximum frequency of error occurrences allowed in one measurement time 1 ms becomes 20,000 bits. For a stable operation of the optical transmission system, it is desired to take a measure for improving the characteristic before the frequency of occurrences of bit error per one measurement time exceeds the above 20,000 bits.

Note, a condition for measuring the frequency of error occurrences in the present invention is not limited to the above specific example. For example, in the above setting, the measurement time per one occurrence of error is made 1 ms, however, if it is assumed that the known Reed-Solomon code (RS [255,239]) is adopted as the error correction code, since one frame length is 12.24 µs (microseconds), the measurement time per one occurrence is equal to or longer than 12.24 µs.

As the measure for improving the characteristic, in the present embodiment, taking notice of the known fact that a time-wise fluctuation in the frequency of error occurrences depends on a deterioration factor of transmission characteristic of the WDM signal light Ls (see Akira Agata et al., "Bit error characteristics for various degradation factors in optical transmission systems", 2002 Society Conference of Institute of Electronics, Information and Communication Engineers, B-10-77 etc.), the deterioration factor is judged by the deterioration factor judging circuit 15 based on the measurement results in the error monitoring circuit 14 and the signal light power is reset according to the judgment result, to achieve the realization of stable operation of the optical transmission system.

Here, a relationship between the distribution of occurrence of bit error and the deterioration factor of transmission characteristic will be simply described. According to the above literature, in the case of signal deterioration due to a noise of the optical amplifier (ASE noise), the distribution of occurrence of bit error is not dependent on a bit pattern but is random, while in the case of signal deterioration due to adjacent channel crosstalk (XT), cross-phase modulation (XPM), stimulated Raman scattering (SRS), and intrachannel four wave mixing (IFWM), it is confirmed that the distribution of occurrence of bit error depends on the bit pattern. This state is shown in FIGS. 4(a) to 4(e).

The graphs of FIGS. 4(a) to 4(e) summarize the error occurrence frequency in each bit of a pseudorandom signal having a transmission rate of 10.7 Gbps and 15 PN stages for each deterioration factor. In FIG. 4, (a) shows the case where ASE noise of the optical amplifier is the deterioration factor, (b) shows the case where SRS is the deterioration factor, (c) shows the case where XPM is the deterioration factor, (d) shows the case where XT is the deterioration factor, and (e) shows the case where IFWM is the deterioration factor. As shown in FIGS. 4(a) to 4(e), in the case where the deterioration factor is ASE noise, the bit error is generally random, while if the deterioration factor is XPM, XT, or IFWM, in particular if the deterioration factor is IFWM, it is understood that the bit error pattern dependency becomes remarkable.

As described above, the time-base distribution of the bit error rate occurring due to transmission wave distortion caused by the fiber nonlinear effect differs from that caused by ASE noise. This corresponds to that a requirement for the error correction capability of the error correction code differs depending on the transmission characteristic deterioration factor, and impacts significantly on the system operation.

If supplementing the relationship between each of these various types of deterioration factors and the signal light power by referring to FIGS. 5(a) and 5(b), and FIGS. 6(a) to 6(e), in the case where there are no adjacent channels, as shown in FIG. 5(a), when a signal light power to noise light power ratio (OSNR) as shown in FIG. 5(b) is deteriorated, with respect to a state where the channel to be measured has the OSNR satisfying the transmission characteristic required in the system as shown in FIG. 5(a), ASE noise is considered to be a main deterioration factor. Further, in the case where there are adjacent channels, when the OSNR is deteriorated as shown in FIG. 6(b) with respect to a normal state shown in FIG. 6(a), ASE noise becomes the main deterioration factor, while when the power of the channel to be measured and of the adjacent channels becomes larger as shown in FIG. 6(c), there is a possibility that the characteristic is deteriorated with XPM as the main deterioration factor. Further, when there is other channels on the outside of the adjacent channels as shown in FIG. 6(d), IFWM is considered to be the main deterioration factor, while when there are signal channels over a wide wavelength band as shown in FIG. 6(e), SRS may be the main deterioration factor.

Based on the relationship between the distribution of occurrence of bit error and each of the deterioration factors, in the present apparatus 1, the judgment of the deterioration factor of the channel to be measured using the time-wise fluctuation in the frequency of error occurrences measured by the error monitoring circuit 14 is performed by the deterioration factor judging circuit 15 and the resetting of the signal light power according to the judgment result is performed by the control signal generating circuit 17. The processing in the deterioration factor judging circuit 15 and control signal generating circuit 17 is performed in accordance with the process shown in a flow chart of FIG. 7 for example.

Figure 7:
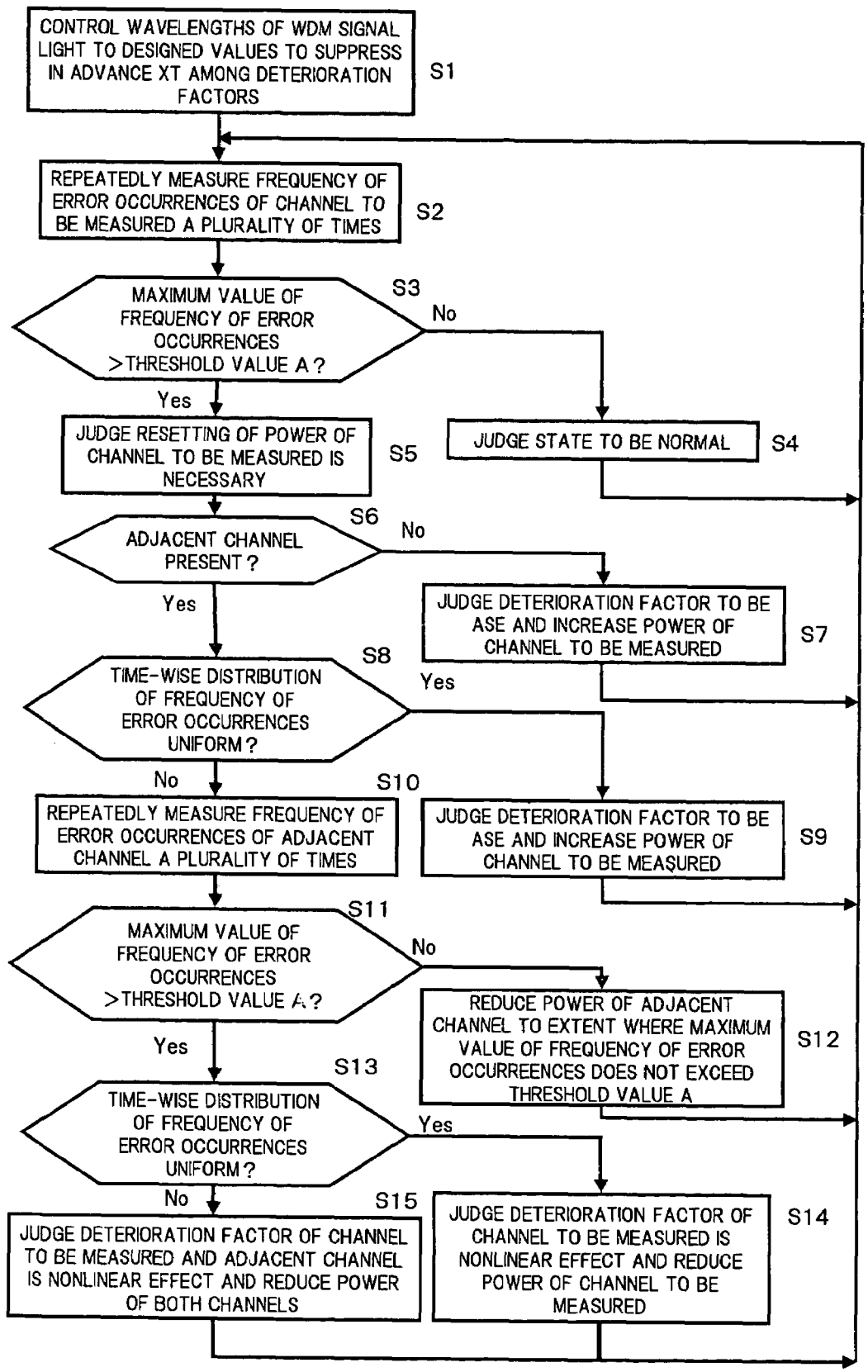
FIG. 7 is a flowchart showing the process of judgment of the deterioration factor and control of signal light power in the first embodiment.

First, at step 1 of FIG. 7 (shown in the figure by "S1", same rule is applied to the below), as a preparatory stage of judging the deterioration factor using the measurement results of the frequency of error occurrences, a wavelength control of the optical transmission section and the like connected with the optical transmission path 2 is performed, so that the respective wavelengths of the WDM signal light Ls transmitted over the optical transmission path 2 satisfy system design values, and information of the wavelengths contained in the WDM signal light Ls is given in advance to the nodes of the optical transmission system. Thus, XT among the deterioration factors of WDM signal light Ls is suppressed in advance.

At step 2, in the error monitoring circuit 14, the frequency of error occurrences for the channel to be measured as described above is repeatedly measured for a previously set number of times (for example, 10 times).

At step 3, in the deterioration factor judging circuit 15 to which the measurement results in the error monitoring circuit 14 were transmitted, a maximum value in the frequency of error occurrencess measured for the plurality of times and a previously set threshold value A are compared with each other. This threshold value A is a value allowed for the frequency of error occurrences in one measurement time and for example is set to 2,000 bits and the like. If the maximum value of the frequency of error occurrences is equal to or less than the threshold value A, control proceeds to step 4 where it is judged that the channel to be measured is in a normal state, then control proceeds to the measurement of a next channel to be measured and the judgment of the deterioration factor. On the other hand, when the maximum value of the frequency of error occurrences exceeds the threshold value A, control proceeds to step 5 where it is judged that the resetting of the signal light power is necessary, then control proceeds to the process of step 6 and of subsequent steps.

Figure 6:
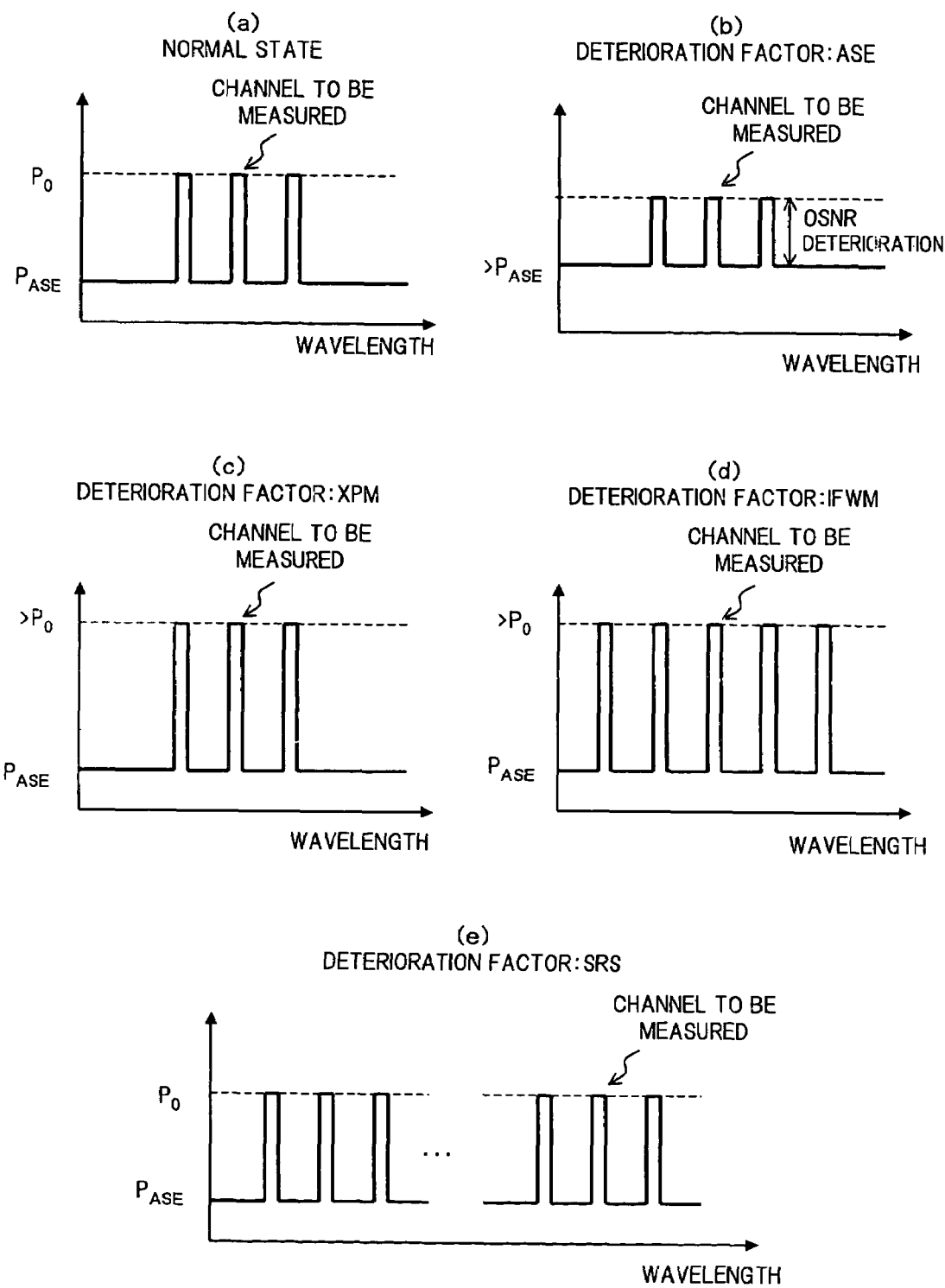
FIGS. 6(a) to 6(e) are pattern diagrams for explaining the relationship of the deterioration factor and signal light power for when there are adjacent channels.

At step 6, as described using the above-mentioned FIG. 5 and FIG. 6, since the deterioration factors which may occur differ depending on whether or not there are signal light on wavelength grids adjacent to the channel to be measured (for example, the ITU-T grids and the like), by referring to the information of the wavelengths of the WDM signal light Ls given at the above step 1, it is investigated if there are signal light on the wavelength grids adjacent the channel to be measured. If there is no signal light on the wavelength grids adjacent to the channel to be measured, control proceeds to step 7, while if there are signal light, control proceeds to step 8.

At step 7, it is judged that ASE noise is the main deterioration factor, and information that the signal light power should be increased so that the frequency of error occurrences becomes equal to or less than the threshold value A is sent from the deterioration factor judging circuit 15 to the control signal generating circuit 17. Based on the information from the deterioration factor judging circuit 15, the control signal generating circuit 17 generates the control signal light Lc for resetting the signal light power corresponding to the channel to be measured. This control signal light Lc is sent via the optical multiplexer 18 to the optical transmission path 2, and the signal light power on a former stage repeater node or the optical transmission apparatus is reset. When the resetting of the signal light power is finished, control returns to step 2 where the above series of process is repeated. Note, if the frequency of error occurrences measured after the resetting of the signal light power is increased over the value before the resetting, the signal light power is reduced, to again perform the process, such as the measurement of the frequency of error occurrences and the like.

At step 8, in the case where there are signal light on one or both of the wavelength grids adjacent to the channel to be measured, it is judged whether the time-wise distribution of the frequency of error occurrences of the channel to be measured is uniform or nonuniform. In this judgment method, for example based on a ratio of the maximum value and average value of the frequency of error occurrences measured repeatedly for 10 times, if a value of the ratio is equal to or less than a previously set threshold value B (for example, B=2 and the like) it is judged that the time-wise distribution of the frequency of error occurrences is uniform, while if the value of the ratio exceeds the threshold value B, it is judged that the time-wise distribution of the frequency of error occurrences is nonuniform. However, the judgment method of the time-wise distribution of the frequency of error occurrences is not limited to the above example. If the time-wise distribution of the frequency of error occurrences is judged to be uniform, control proceeds to step 9, while if it is judged to be nonuniform, control proceeds to step 10.

At step 9, it is judged that ASE noise is the main deterioration factor, and in the same way as the above step 7, the control is performed to increase the signal light power, then control returns to step 2 where the above series of process is repeated.

At step 10, it is judged that the channel to be measured is deteriorated due to a nonlinear effect by influences of the adjoining channels, and the frequency of error occurrences is repeatedly measured for a plurality of times for not only the channel to be measured, but also the adjacent channels.

At step 11, in the same way as the above step 3, the maximum value in the frequency of error occurrences measured for the plurality of times and the previously set threshold value A are compared with each other for each adjacent channel. If the maximum value of the frequency of error occurrences is equal to or less than the threshold value A, control proceeds to step 12, while if it exceeds the threshold value A, control proceeds to step 13.

At step 12, since it has been confirmed that characteristics of the adjacent channels are not deteriorated, the power of each of the adjacent channels is reset to be reduced to the extent that the maximum value of the frequency of error occurrences of each of the adjacent channel does not exceed the threshold value A, to reduce the influences of the adjacent channels on the channel to be measured. When the resetting of the adjacent channel power is finished, control returns to step 2 where the above series of process is repeated. Note, in the series of process after the resetting of the adjacent channel power, if it is judged at step 11 that the maximum value of the frequency of error occurrences of each of the adjacent channels is equal to or less than the threshold value A, the power of the channel to be measured is reduced, to perform again the process, such as the measurement of the frequency of error occurrences and the like.

At step 13, in the same way as the above step 8, it is judged whether the time-wise distribution of the frequency of error occurrences of the adjoining channels is uniform or nonuniform. If uniform, control proceeds to step 14, while if not uniform, control to step 15.

At step 14, it is judged that the main deterioration factor for the channel to be measured is the nonlinear effect, the main deterioration factor for the adjacent channels is ASE noise, and the deterioration of the channel to be measured due to the influences of the adjacent channels is small, and the power of the channel to be measured is reset to be reduced. When the resetting of the power of the channel to be measured is finished, control returns to step 12 where the above series of the process is repeated.

At step 15, it is judged that the main deterioration factors of the channel to be measured and the adjacent channels are the nonlinear effects, and both powers of the channel to be measured and of the adjacent channels are reset to be reduced. When the resetting is finished, control returns to step 2 where the above series of process is repeated.

When the series of process of the step 2 to step 15 described above is finished for one channel to be measured, succeedingly, based on the information of the wavelengths contained in the WDM signal light Ls given at step 1, signal light of another wavelength is selected by the wavelength selector 12 to be set as the channel to be measured, and the series of process of step 2 to step 15 is repeated. Note, if the maximum value of the frequency of error occurrences exceeds the threshold value A even if the series of process of step 2 to step 15 is repeated for the previously set number of times for one channel to be measured, a measure is taken, such as requiring the resetting of wavelength path for a managing section of the optical transmission system.

As described above, according to the apparatus 1 of the first embodiment, by repeatedly measuring the frequency of error occurrences for the plurality of times for the signal light of each wavelength contained in the WDM signal light Ls, and based on the measurement results, the deterioration factor of the signal light is judged in accordance with the predetermined process, to perform the resetting of the signal light power. Thus, it becomes possible to quickly and accurately improve the transmission characteristic of signal light by a simple process even when the signal quality is deteriorated during the operation of the optical transmission system.

Note, in the first embodiment, a dedicated wavelength channel has been prepared to transmit the control signal light Lc to another node and the like. However, a system of transmission of the control signal light Lc in the present invention is not limited thereto. For example, in the case where a node including a Raman amplifier is adopted to the apparatus 1, a pumping light for Raman amplification may be modulated by an electrical control signal to transmit information corresponding to the control signal light Lc to another apparatus. Further, it is also possible to use a separate line from the optical transmission path 2 propagating therethrough the WDM signal light Ls, to transmit the control signal light Lc to another node.

Figure 8:
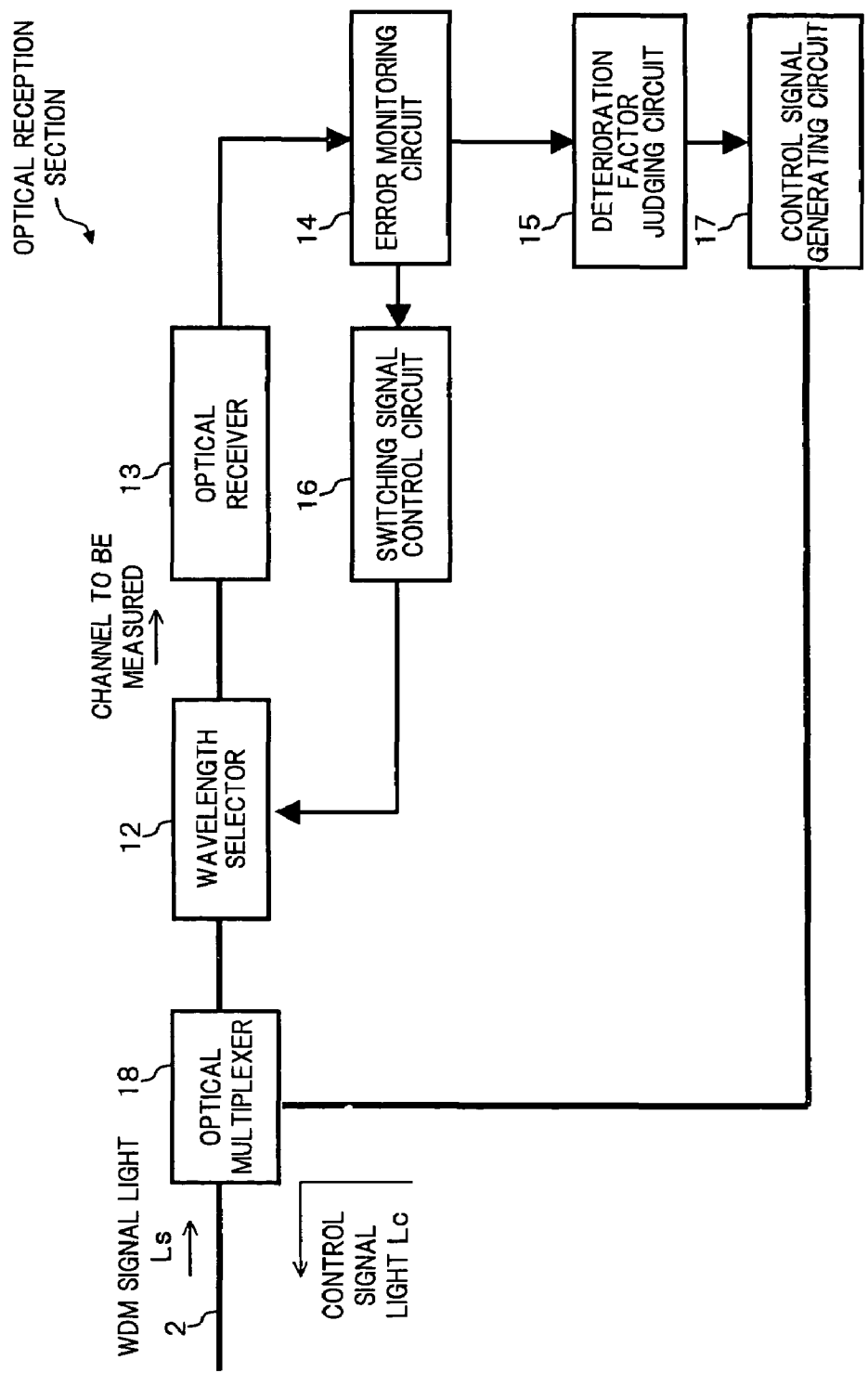
FIG. 8 is a diagram showing another configuration example related to the first embodiment.

Further, the description has been made on the case where the apparatus 1 is applied to the repeater node located in the middle of the optical transmission path 2. However, for example as shown in FIG. 8, it is of course also possible to apply the apparatus 1 to the optical reception section connected with one end of the optical transmission path 2. In this case, the WDM signal light Ls propagated through the optical transmission path 2 and given to the optical reception section passes through the optical multiplexer 18, and then is input to the wavelength selector 12. The configuration and operation of from the wavelength selector 12 are similar to those in the first embodiment.

Next, a second embodiment of the present invention will be described.

Figure 9:
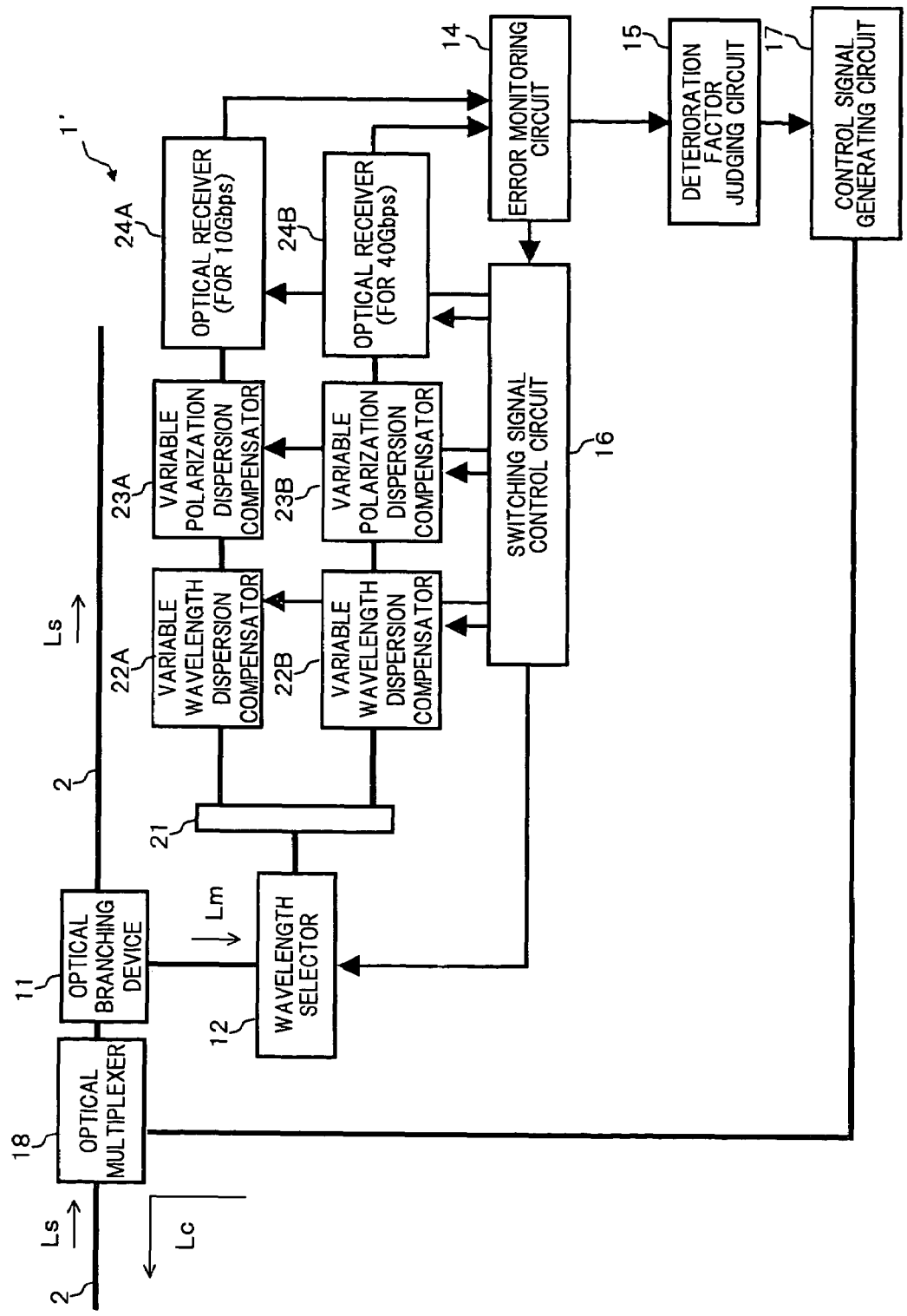
FIG. 9 is a block diagram showing an apparatus according to a second embodiment of the present invention.

FIG. 9 is a block diagram of the second embodiment of the apparatus to which the monitoring method of the signal quality according to the present invention is applied.

In FIG. 9, an apparatus 1' of the second embodiment is a modified example of the above first embodiment, coping with the case where the signal quality cannot be monitored by one type of optical receiver since the WDM signal light Ls being propagated through the optical transmission path 2 contains signal lights of different bit rates. Specifically, the configuration of the apparatus 1' differs from the configuration of the apparatus 1 shown in FIG. 1 in that, between the wavelength selector 12 and the error monitoring circuit 14, there are provided an optical branching device 21, variable wavelength dispersion compensators 22A and 22B, variable polarization dispersion compensators 23A and 23B, and optical receivers 24A and 24B. The configuration other than the above is the same as that of the first embodiment, so the description thereof will be omitted here.

The optical branching device 21 branches the channel to be measured selected by the wavelength selector 12 into a plurality of lights in accordance with the types of bit rates of the signal lights contained in the WDM signal light Ls propagated through the optical transmission path 2. Here, for example, assuming the case where signal lights of two types of bit rates of 10 Gbps and 40 Gbps are contained in the WDM signal light Ls, the channel to be measured from the wavelength selector 12 is branched into two by the optical branching device 21.

The variable wavelength dispersion compensators 22A and 22B each receives the channel to be measured branched by the optical branching device 21 and compensates for the wavelength dispersion occurred in the channel to be measured. A compensation amount of the wavelength dispersion in each of the variable wavelength dispersion compensators 22A and 22B is variably controlled to a required value corresponding to the channel to be measured in accordance with the switching signal transmitted from the switching signal control circuit 16.

The variable polarization dispersion compensators 23A and 23B each receives the channel to be measured of which wavelength dispersion is compensated by each of the variable wavelength dispersion compensators 22A and 22B, and compensates for the polarization dispersion occurred in the channel to be measured. A compensation amount of the polarization dispersion in each of the variable polarization dispersion compensators 23A and 23B is also variably controlled to a required value corresponding to the channel to be measured in accordance with the switching signal in the same way as in each of the variable wavelength dispersion compensators 22A and 22B.

The optical receiver 24A is a known optical receiver capable of receiving to process a signal light having a bit rate of 10 Gbps, which converts the channel to be measured output from the variable polarization dispersion compensator 23A into an electrical signal, to output the electrical signal to the error monitoring circuit 14. Further, the optical receiver 24B is a known optical receiver capable of receiving to process a signal light having a bit rate of 40 Gbps, which converts the channel to be measured output from the variable polarization dispersion compensator 23B into an electrical signal, to output the electrical signal to the error monitoring circuit 14. Which optical receiver, the 10 Gbps optical receiver 24A or the 40 Gbps optical receiver 24B, is driven to monitor the signal quality, is switched in accordance with the switching signal from the switching signal control circuit 16 based on the correspondence of wavelengths to bit rates.

In the apparatus 1' described above, the quality of the WDM signal light Ls being propagated through the optical transmission path 2 is monitored and controlled in accordance with the process similar to that of the first embodiment, while selectively utilizing the optical receivers 24A and 24B corresponding to the bit rate of the channel to be measured.

Thus, it becomes possible to obtain an effect similar to that in the first embodiment for the WDM signal light Ls containing the signal lights of different bit rates.

Note, in the above second embodiment, the example which copes with the WDM signal light Ls containing the signal lights of 10 Gbps and 40 Gbps has been described. However, the present invention can be applied for WDM signal light including more than three types of bit rates by preparing optical receivers and the like corresponding to the bit rates, in the same way as in the above case. Further, here, the description has been made on the case of different bit rates of signal lights, but it is also possible to cope with, for example, WDM signal light containing signal lights of different modulation schemes by providing optical receivers corresponding to the different modulation schemes. Specifically, in the case where a signal light of a modulation scheme which cannot be directly detected, for example, a signal light of a phase modulation scheme, is contained in the WDM signal light, it is sufficient to prepare an optical receiver capable of receiving to process the signal light of the phase modulation scheme.

Further, in the second embodiment, the variable wavelength dispersion compensators 22A and 22B, and the variable polarization dispersion compensators 23A and 23B have been provided, to compensate for the wavelength dispersion and polarization dispersion of the channel to be measured. However, in the case where the compensation for wavelength dispersion and polarization dispersion is unnecessary, in the case where the compensation for wavelength dispersion and polarization dispersion has been performed on the WDM signal light before the WDM signal light is branched in the optical branching device 11 on the optical transmission path 2, or the like, the variable wavelength dispersion compensators 22A and 22B and the variable polarization dispersion compensators 23A and 23B may be omitted, to monitor and control the signal quality.

Next, a third embodiment of the present invention will be described.

Figure 10:
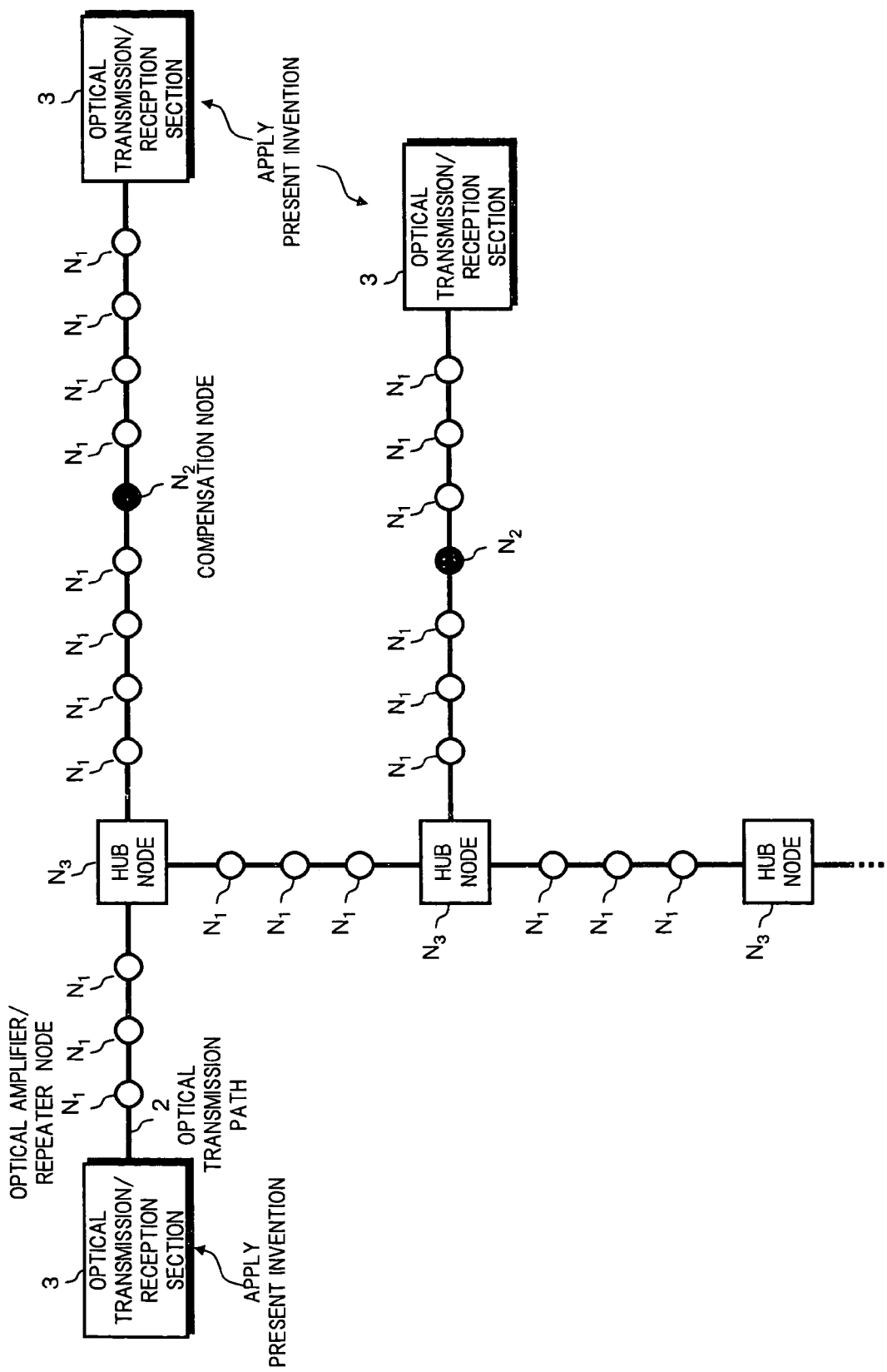
FIG. 10 is a block diagram of an optical transmission system according to a third embodiment of the present invention.

FIG. 10 is a block diagram showing an optical transmission system to which the monitoring method of the signal quality according to the present invention is applied.

Figure 14:
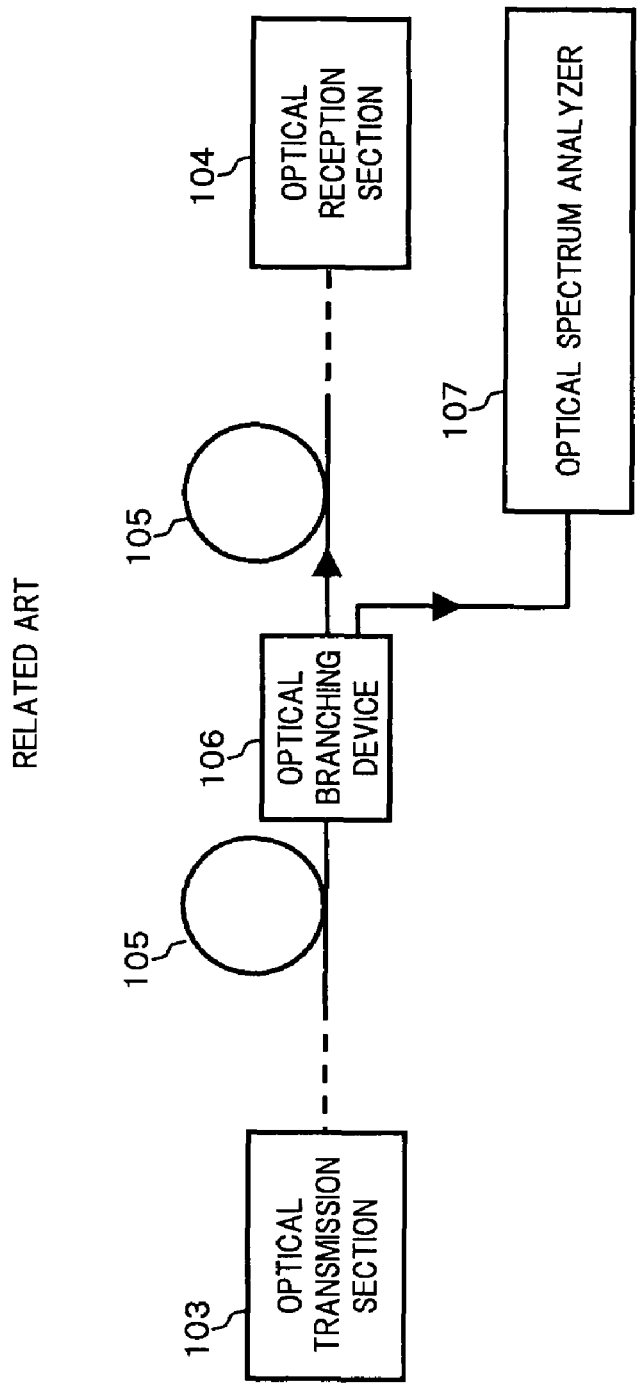
FIG. 14 is a diagram for explaining a conventional method of monitoring the quality of signal light using an optical spectrum analyzer.
Figure 16:
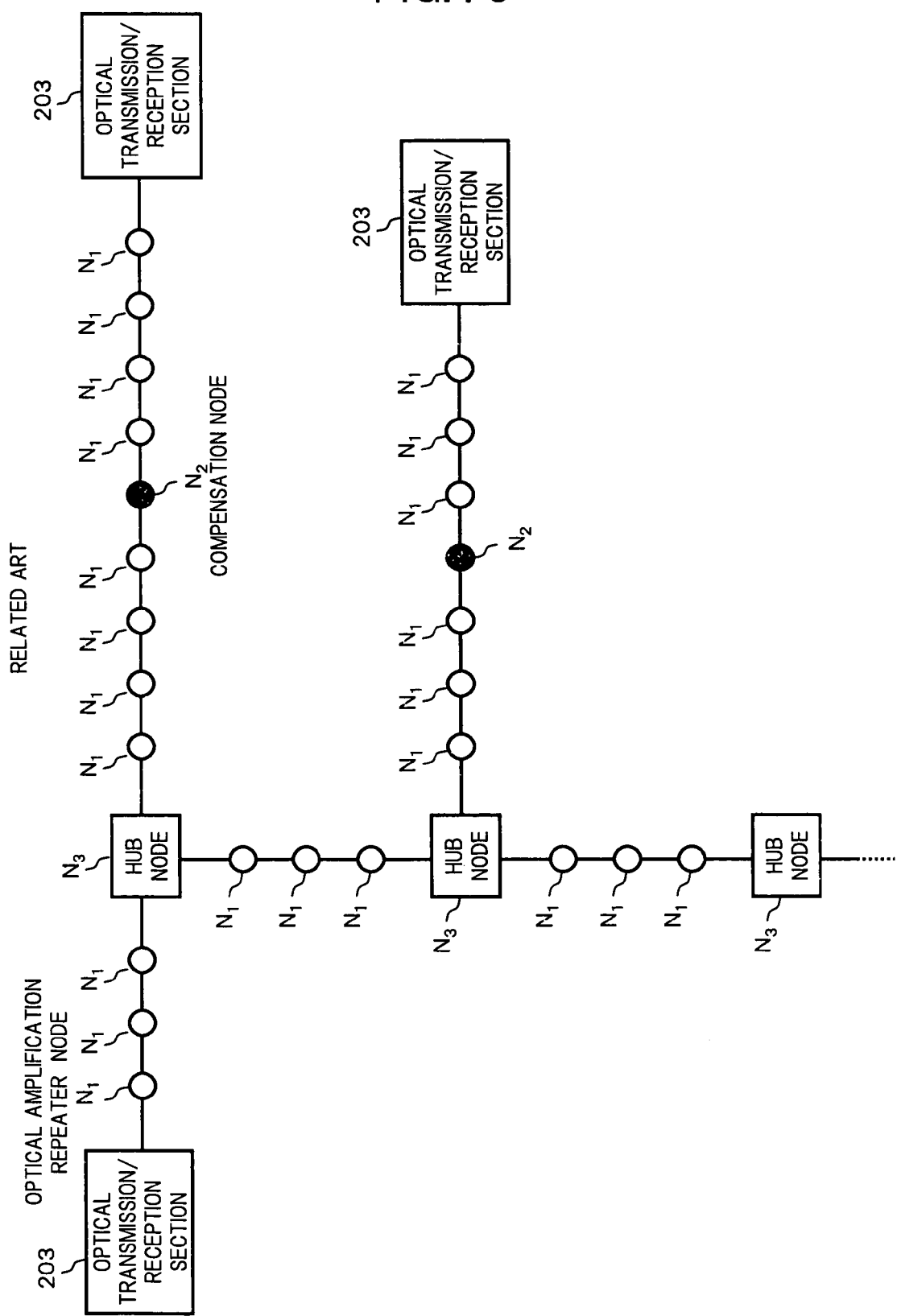
FIG. 16 is a diagram showing a configuration example of a known next generation optical transmission system.

The optical transmission system shown in FIG. 10 is configured such that, in a known network configuration applied with optical amplification repeater nodes $N_1$, compensation nodes $N_2$, and hub nodes $N_3$ as shown in FIG. 16, for example, each of the optical transmission/reception sections 3 is provided with the configuration of the optical reception section to which the present invention as shown in FIG. 8 is applied. Further, here, the compensation nodes $N_2$ and the hub nodes $N_3$ are provided with conventional configurations for monitoring the signal quality utilizing the optical spectrum analyzer as shown in FIG. 14.

In the optical transmission system of the above configuration, the optical power, wavelength, and OSNR for each channel of the WDM signal light Ls transmitted over the optical transmission path 2 are monitored at the compensation nodes $N_2$ and the hub nodes $N_3$. Thus, in the case where it is confirmed that the wavelength deviation of any of the channels exceeds a prescribed value, a control signal for correcting this wavelength deviation is sent to the optical transmission/reception section 3 and the transmitted wavelength of the channel is adjusted. Information of the optical power, wavelength, and OSNR of each channel monitored at the compensation nodes $N_2$ and hub nodes $N_3$ is transmitted to other nodes (including optical transmission/reception sections 3). Note, monitoring items of the signal light at each of the compensation nodes $N_2$ and hub nodes $N_3$ may be only the optical power and wavelength.

In each of the optical transmission/reception sections 3, to which the method of monitoring the signal quality according to the present invention is applied, the quality of each channel of the WDM signal light Ls propagated through a required wavelength path to be received by each optical transmission/reception section 3 is monitored in accordance with the process similar to that in the first embodiment described above. Thus, for example, in the case where it is judged that an increase in the signal light power of a certain channel is necessary, the information of the optical power or OSNR of each of the channels transmitted from the compensation nodes $N_2$ and hub nodes $N_3$ is analyzed, and a compensation interval with a relatively low optical power or OSNR of the certain channel is searched for. Further, a control signal instructing the increase of optical power of the certain channel is transmitted to the initial node forming the compensation interval (optical transmission section 3, compensation node $N_2$, or hub node $N_3$), to achieve the improvement of the signal quality.

On the other hand, in the case where it is judged that reduction of the signal light power of a certain channel is necessary, the information of the optical power or OSNR of each of the channels transmitted from the compensation nodes $N_2$ and hub nodes $N_3$ is analyzed and a compensation interval with a relatively high optical power or OSNR of the certain channel is searched for. Further, a control signal instructing the reduction of optical power of the certain channel is transmitted to the initial node forming the compensation interval, to achieve the improvement of the signal quality.

However, in the system adopting hub nodes, OADM nodes, and OXC nodes, it is assumed that the signal channels which existed on the wavelength grids adjacent to a certain channel to be measured make the channel to be measured deteriorated in the signal quality due to the nonlinear effect, and then branched at the node on the way, and there are no longer any adjacent channels when the channel to be measured reached the receiving end. In the case where the deterioration of the quality of the channel to be measured is increased due to the nonlinear effect under such a circumstance, there is caused a problem in that even if the conventional technology is adopted and it is judged that the signal quality is deteriorated at the receiving end, since OSNR at the node on the way becomes a value with no problem, it becomes impossible to specify the deterioration factor and the interval where the deterioration factor exists.

If the method of monitoring the signal quality according to the present invention is applied to the optical transmission system as shown in FIG. 10, it becomes possible to judge whether the deterioration factor of the channel to be measured is the nonlinear effect by the adjacent channels based on the time-wise distribution of the frequency of error occurrences, thereby enabling the above problem to be solved.

Note, in the optical transmission system shown in FIG. 10, the example in which the method of monitoring the signal quality according to the present invention is applied to the optical transmission/reception section 3 has been shown. However, the configuration according to the present invention as shown in FIG. 1 or FIG. 9 may be applied to the compensation nodes $N_2$ in addition to the optical transmission/reception sections 3. Further, it is also possible to apply a conventional configuration of monitoring the signal quality utilizing an optical spectrum analyzer to the optical amplification repeater nodes $N_1$.

Figure 15:
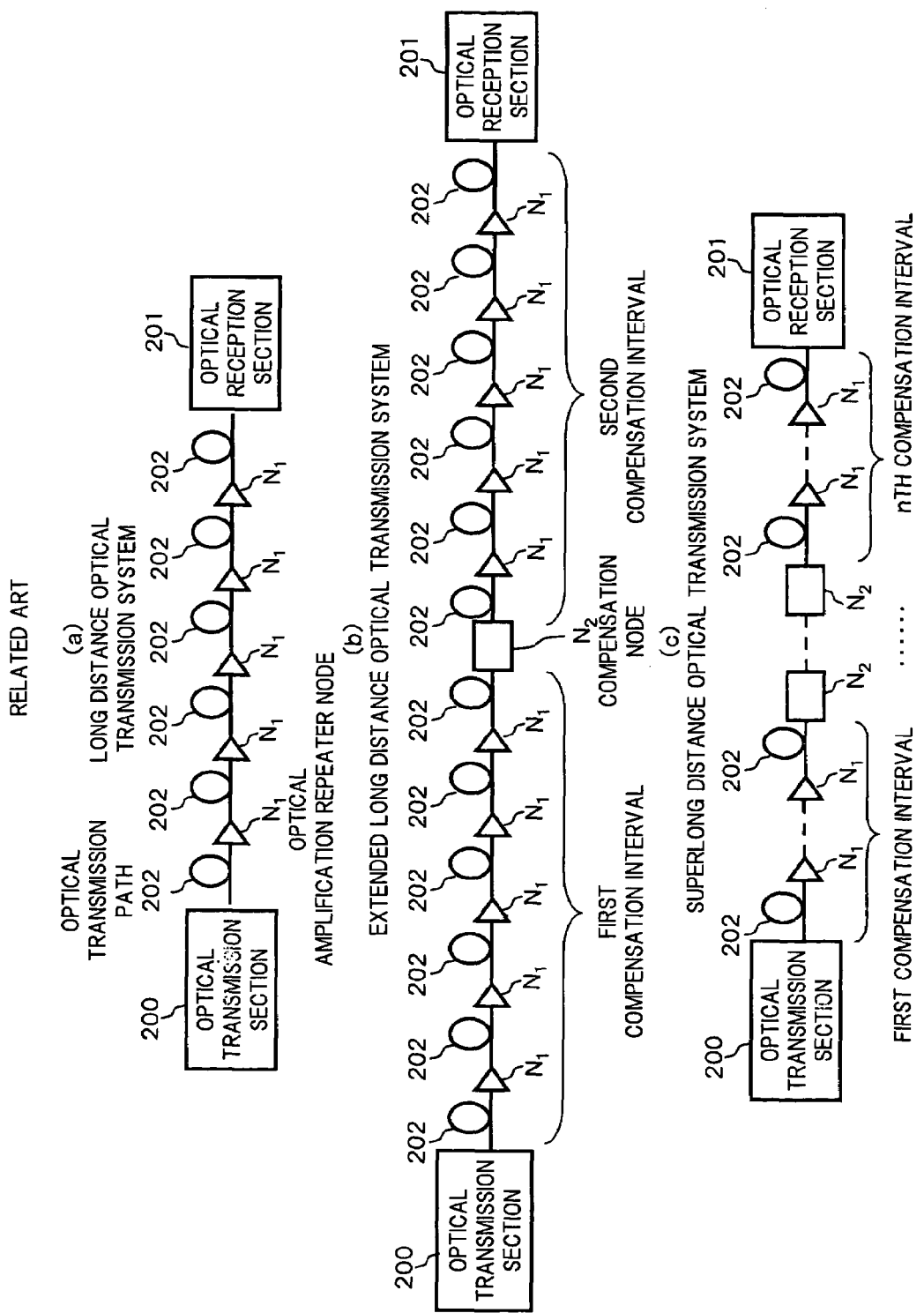
FIGS. 15(a) to 15(c) are diagrams showing configuration examples of a typical optical transmission system for transmitting an optical signal for a long distance without converting it into an electrical signal.

Further, in the third embodiment, the network-type optical transmission system has been described. However, it is also possible to apply the monitoring method of the signal quality according to the present invention to the optical reception section or compensation nodes in the same way as in the third embodiment, for the optical transmission system for performing the point-to-point transmission as shown in FIGS. 15(a) to 15(c). Note, in the case of a system configuration which does not include compensation nodes as shown in FIG. 15(a), the present invention is applied to only the optical reception section. In this case, a configuration utilizing the optical spectrum analyzer as shown in FIG. 14 may also be applied to the optical amplification repeater nodes $N_1$.

Next, a fourth embodiment of the present invention will be described. Here, as an application example of the apparatus of the first embodiment described above, consideration is made on the case where the quality of WDM signal light being propagated through a plurality of optical transmission paths is monitored and controlled.

Figure 11:
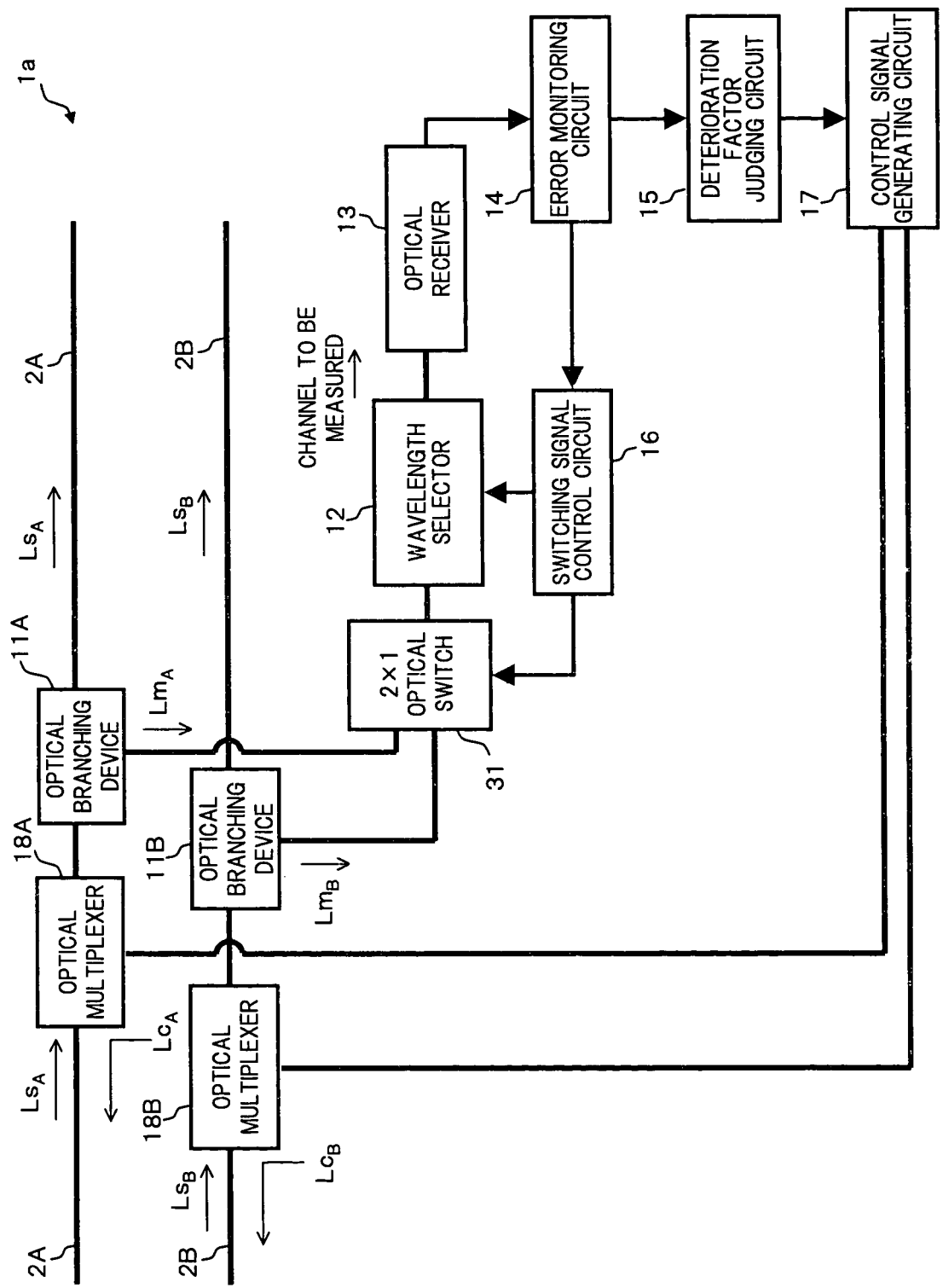
FIG. 11 is a block diagram of an apparatus according to a fourth embodiment of the present invention.

FIG. 11 is a configuration example of the apparatus according to the fourth embodiment. In an apparatus 1a shown in FIG. 11, for example, parts of the WDM signal lights $LS_A$ and $LS_B$ being propagated through two optical transmission paths 2A and 2B in the same direction are branched by the optical branching devices 11A and 11B, to be sent to a 2×1 optical switch 31. At the 2×1 optical switch 31, one of monitor lights $Lm_A$ and $Lm_B$ from the optical branching devices 11A and 11B is output to the wavelength selector 12 while being switched in time-wise in accordance with the switching signal from the switching signal control circuit 16. Then, the wavelength selector 12 extracts the signal light of required wavelength as the channel to be measured, to give the extracted signal light to the optical receiver 13. Thus, in the same way as in the above-described first embodiment, the qualities of the WDM signal light $LS_A$ and $LS_B$ transmitted over the optical transmission paths 2A and 2B are monitored, respectively. If the deterioration factor judging circuit 15 judges the deterioration of the signal light, control signal lights $LC_A$ and $LC_B$ for improving the signal qualities are generated by the control signal generating circuit 17. The control signal lights $LC_A$ and $LC_B$ output from the control signal generating circuit 17 are transmitted to the corresponding optical signal lines 2A and 2B via the optical multiplexers 18A and 18B, thereby the power of the corresponding signal light is increased or decreased.

Thus, the qualities of the WDM signal lights $LS_A$ and $LS_B$ transmitted over the different optical transmission paths 2A and 2B are monitored and controlled by time-division, and an effect similar to that in the first embodiment can be obtained.

Note, in the fourth embodiment, the configuration example corresponding to two optical transmission paths has been shown. However, the present invention can also be applied to three or more optical transmission paths in the same way as in the above case.

Next, a fifth embodiment of the present invention will be described. Here, consideration is made on the case where the qualities of the WDM signal lights transmitted in bi-directions over the optical transmission path, for example, as another application example of the apparatus of the first embodiment described above.

Figure 12:
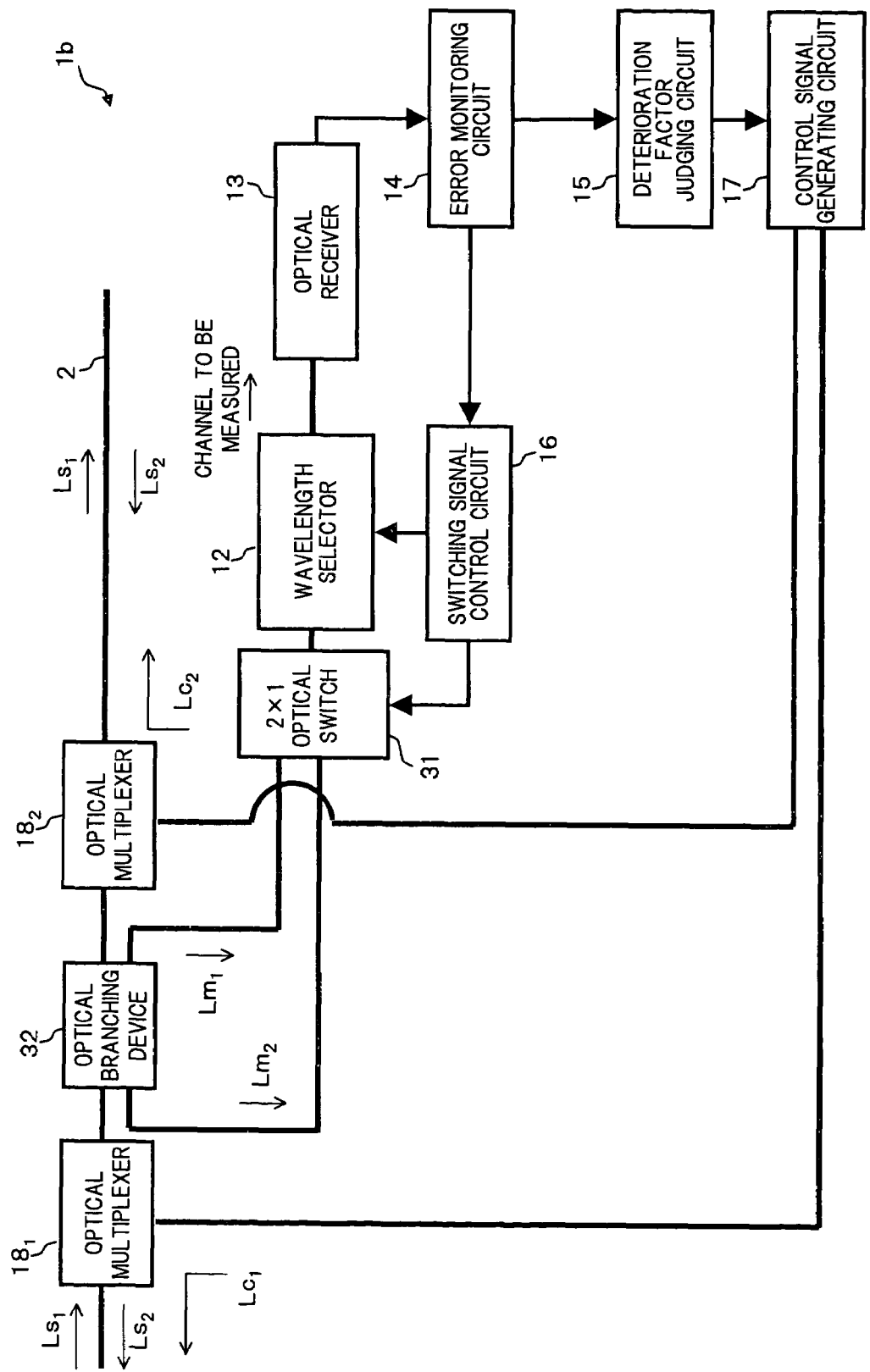
FIG. 12 is a block diagram of an apparatus according to a fifth embodiment of the present invention.
Figure 13:
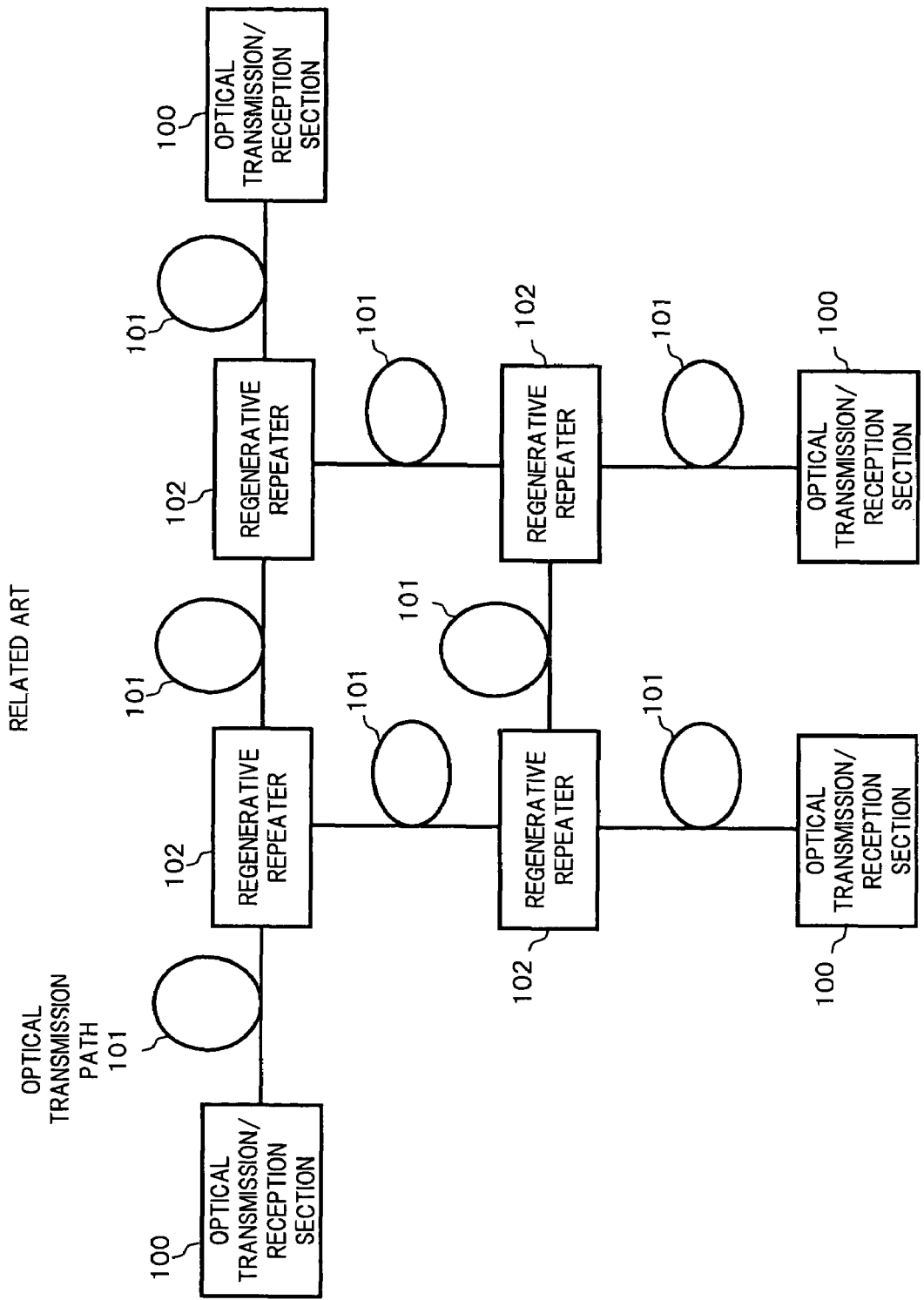
FIG. 13 is a diagram showing a configuration example of a conventional optical transmission system using electrical regenerative repeaters.

FIG. 12 is a diagram showing a configuration example of the apparatus according to the fifth embodiment. In an apparatus 1b shown in FIG. 12, parts of the WDM signal lights $Ls_1$ and $Ls_2$ of uplink and downlink sides transmitted over one optical transmission path 2 are branched by an optical branching device 32 having four ports, to be sent to the 2×1 optical switch 31. In the 2×1 optical switch 31, one of the uplink side monitor light $Lm_1$ and the downlink side monitor light $Lm_2$ output from the optical branching device 32 is output to the wavelength selector 12 while being switched in time-wise in accordance with the switching signal from the switching signal control circuit 16. Then, in the wavelength selector 12, the signal light of required wavelength is extracted as the channel to be measured, to be given to the optical receiver 13. Thus, in the same way as in the first embodiment described above, the qualities of the uplink side WDM signal light $Ls_1$ and the downlink side WDM signal light $Ls_2$ are monitored. If the deterioration factor judging circuit 15 judges that the signal light is deteriorated, the control signal lights $Lc_1$ and $Lc_2$ for improving the signal qualities are generated by the control signal generating circuit 17. The control signal lights $Lc_1$ and $Lc_2$ output from the control signal generating circuit 17 are transmitted via the optical multiplexers $18_1$ and $18_2$ to the former stage node, thereby the power of the corresponding signal light is increased or decreased.

Thus, the qualities of the uplink and downlink side WDM signal lights $Ls_1$ and $Ls_2$ transmitted in bi-directions over the optical transmission path 2 are monitored and controlled by time-division, and an effect similar to that in the first embodiment can be obtained.

What is claimed is:

1. A quality monitoring method of wavelength division multiplexed signal light, for monitoring the quality of a wavelength division multiplexed signal light transmitted via an optical transmission path, comprising:
    branching a part of the wavelength division multiplexed signal light being propagated through said optical transmission path as a monitor light:
    selecting, as an object to be measured, a signal light of one wavelength from the signal lights of a plurality of wavelengths contained in said branched monitor light;
    repeatedly measuring for a plurality of times the frequency of occurrences of bit error in a previously set time for said selected signal light to be measured;
    judging based on said measurement results as to whether or not said signal light to be measured is deteriorated in the quality thereof, together with a deterioration factor; and
    outputting said judgment result as monitoring information,
    wherein, when it is judged that said signal light to be measured is deteriorated in the quality thereof, it is judged whether or not signal lights exist on wavelength grids adjacent to said signal light to be measured, and when the signal lights exist on the adjacent wavelength grids, the frequency of occurrences of bit error in the previously set time is repeatedly measured for the plurality of times for the signal lights on the adjacent grids, and the deterioration factor of said signal light to be measured is judged based on said measurement results.

2. A quality monitoring method of wavelength division multiplexed signal light according to claim 1, further comprising:
    generating a control signal for adjusting the power of said signal light to be measured according to said monitoring information; and
    transmitting said control signal to the optical transmission path.

3. A quality monitoring method of wavelength division multiplexed signal light according to claim 1,
    wherein the judgment as to whether or not said signal light to be measured is deteriorated in the quality thereof is performed based on a maximum value in the frequency of occurrences of bit error repeatedly measured for the plurality of times.

4. A quality monitoring method of wavelength division multiplexed signal light according to claim 1,
    wherein the judgment of the deterioration factor of said signal light to be measured is performed based on the uniformity of time-wise distribution of the frequency of occurrences of bit error for said signal lights on the adjacent grids.

5. A quality monitoring method of wavelength division multiplexed signal light according to claim 4,
wherein, when the time-wise distribution of the frequency of occurrences of bit error for said signal lights on the adjacent grids is more uniform than a previously set state, it is judged that said signal light to be measured is deteriorated due to a noise light generated in an optical amplifier disposed on said optical transmission path being a main factor, while when the time-wise distribution of the frequency of occurrences of bit error for said signal lights on the adjacent grids is less uniform than said previously set state, it is judged that said signal light to be measured is deteriorated due to a non-linear effect being a main factor.

6. A quality monitoring method of wavelength division multiplexed signal light according to claim 5, further comprising:
generating a control signal for increasing the power of said signal light to be measured, when it is judged that the main factor of the deterioration of said signal light to be measured is the noise light generated in the optical amplifier; and
generating a control signal for reducing the power of said signal light to be measured, when it is judged that the main factor of the deterioration of said signal light to be measured is the non-linear effect.

7. A quality monitoring apparatus of wavelength division multiplexed signal light, for monitoring the quality of a wavelength division multiplexed signal light transmitted via an optical transmission path, comprising:
an optical branching section that branches a part of the wavelength division multiplexed signal light being propagated through said optical transmission path as a monitor light;
a wavelength selecting section that selects, as an object to be measured, a signal light of one wavelength from the signal lights of a plurality of wavelengths contained in said branched monitor light;
a bit error measuring section that repeatedly measures for a plurality of times the frequency of occurrences of bit error in a previously set time for said selected signal light to be measured;
a switching control section that generates a switching signal for controlling an operation of said wavelength selecting section according to measurement results in said bit error measuring section; and
a deterioration factor judging section that judges based on said measurement results in said bit error measuring section as to whether or not said signal light to be measured is deteriorated in the quality thereof, together with a deterioration factor, and outputs said judgment result as monitoring information,
wherein said deterioration factor judging section, when judged that said signal light to be measured is deteriorated in the quality thereof, judges whether or not signal lights exist on wavelength grids adjacent to said signal light to be measured, and when the signal lights exist on the adjacent wavelength grids, repeatedly measures for the plurality of times the frequency of occurrences of bit error in the previously set time for the signal lights on the adjacent grids, and judges the deterioration factor of said signal light to be measured based on said measurement results.

8. A quality monitoring apparatus of wavelength division multiplexed signal light according to claim 7, further comprising:
a control signal generating section that generates a control signal for adjusting the power of said signal light to be measured according to said monitoring information output from said deterioration factor judging section; and
an optical multiplexing section that transmits said control signal generated in said control signal generating section to the optical transmission path.

9. A quality monitoring apparatus of wavelength division multiplexed signal light according to claim 7,
wherein said deterioration factor judging section judges whether or not said signal light to be measured is deteriorated in the quality thereof based on a maximum value in the frequency of occurrences of bit error repeatedly measured for the plurality of times in said bit error measuring section.

10. A quality monitoring apparatus of wavelength division multiplexed signal light according to claim 7,
wherein said deterioration factor judging section judges the deterioration factor of said signal light to be measured based on the uniformity of time-wise distribution of the frequency of occurrences of bit error for said signal lights on the adjacent grids measured in said bit error measuring section.

11. A quality monitoring apparatus of wavelength division multiplexed signal light according to claim 10,
wherein said deterioration factor judging section, when the time-wise distribution of the frequency of occurrences of bit error for said signal lights on the adjacent grids is more uniform than a previously set state, judges that said signal light to be measured is deteriorated due to a noise light generated in an optical amplifier disposed on said optical transmission path being a main factor, while when the time-wise distribution of the frequency of occurrences of bit error for said signal lights on the adjacent grids is less uniform than said previously set state, judges that said signal light to be measured is deteriorated due to a non-linear effect being a main factor.

12. A quality monitoring apparatus of wavelength division multiplexed signal light according to claim 11, further comprising:
a control signal generating section that generates a control signal for increasing the power of said signal light to be measured, when it is judged in said deterioration factor judging section that the main factor of the deterioration of said signal light to be measured is the noise light generated in the optical amplifier, and generates a control signal for reducing the power of said signal light to be measured, when it is judged in said deterioration factor judging section that the main factor of the deterioration of said signal light to be measured is the non-linear effect; and
an optical multiplexing section that transmits the control signals generated in said control signal generating section to the optical transmission path.

13. An optical transmission system in which a wavelength division multiplexed signal light is transmitted between an optical transmission section and an optical reception section via an optical transmission path and one or more repeater node disposed on said optical transmission path,
wherein at least one of said optical transmission section and said repeater node is provided with a quality monitoring apparatus of wavelength division multiplexed signal light in claim 7.

14. An optical transmission system according to claim 13, wherein parts of a plurality of repeater nodes disposed on said optical transmission path are provided with apparatuses for monitoring the quality based on measurement of the optical spectrum of the wavelength division multiplexed signal light.

15. A quality monitoring apparatus of wavelength division multiplexed signal light, for monitoring the quality of a wavelength division multiplexed signal light transmitted via an optical transmission path, comprising:
 an optical branching section that branches a part of the wavelength division multiplexed signal light being propagated through said optical transmission path as a monitor light;
 a wavelength selecting section that selects, as an object to be measured, a signal light of one wavelength from the signal lights of a plurality of wavelengths contained in said branched monitor light;
 a bit error measuring section that repeatedly measures for a plurality of times the frequency of occurrences of bit error in a previously set time for said selected signal light to be
 a switching control section that generates a switching signal for controlling an operation of said wavelength selecting section according to measurement results in said bit error measuring section; and
 a deterioration factor judging section that judges based on said measurement results in said bit error measuring section as to whether or not said signal light to be measured is deteriorated in the quality thereof, together with a deterioration factor, and outputs said judgment result as monitoring information, wherein
 when the wavelength division multiplexed signal light transmitted over said optical transmission path contains signal lights of different bit rates, and
 said wavelength selecting section includes an optical branching device for branching a signal light to be measured selected by said wavelength selecting section into a plurality of lights according to types of bit rates of the signal lights contained in the wavelength-division multiplexed signal light, and a plurality of optical receivers corresponding to the bit rates of the signal lights, and the lights branched by said optical branching device are given to said optical receivers.

16. A quality monitoring apparatus of wavelength division multiplexed signal light, for monitoring the quality of a wavelength division multiplexed signal light transmitted via an optical transmission path, comprising:
 an optical branching section that branches a part of the wavelength division multiplexed signal light being propagated through said optical transmission path as a monitor light;
 a wavelength selecting section that selects, as an object to be measured, a signal light of one wavelength from the signal lights of a plurality of wavelengths contained in said branched monitor light;
 a bit error measuring section that repeatedly measures for a plurality of times the frequency of occurrences of bit error in a previously set time for said selected signal light to be measured;
 a switching control section that generates a switching signal for controlling an operation of said wavelength selecting section according to measurement results in said bit error measuring section; and
 a deterioration factor judging section that judges based on said measurement results in said bit error measuring section as to whether or not said signal light to be measured is deteriorated in the quality thereof, together with a deterioration factor, and outputs said judgment result as monitoring information,
 wherein said optical branching section includes a plurality of optical branching devices for branching parts of the wavelength division multiplexed signal lights being propagated through a plurality of optical transmission paths as monitor lights, and any one of the monitor lights branched by said optical branching devices is switched in time-wise to be given to said wavelength selecting section, thereby the qualities of the wavelength division multiplexed signal lights being propagated through said plurality of optical transmission paths being monitored by time-division.

17. A quality monitoring apparatus of wavelength division multiplexed signal light, for monitoring the quality of a wavelength division multiplexed signal light transmitted via an optical transmission path, comprising:
 an optical branching section that branches a part of the wavelength division multiplexed signal light being propagated through said optical transmission path as a monitor light;
 a wavelength selecting section that selects, as an object to be measured, a signal light of one wavelength from the signal lights of a plurality of wavelengths contained in said branched monitor light;
 a bit error measuring section that repeatedly measures for a plurality of times the frequency of occurrences of bit error in a previously set time for said selected signal light to be measured;
 a switching control section that generates a switching signal for controlling an operation of said wavelength selecting section according to measurement results in said bit error measuring section; and
 a deterioration factor judging section that judges based on said measurement results in said bit error measuring section as to whether or not said signal light to be measured is deteriorated in the quality thereof, together with a deterioration factor, and outputs said judgment result as monitoring information,
 wherein said optical branching section includes an optical branching device capable to branch parts of the wavelength division multiplexed signal lights being propagated in bi-directions through the optical transmission path as monitor lights, and one of the monitor lights corresponding to propagation directions branched by said optical branching device is switched in time-wise to be given to said wavelength selecting section, thereby the qualities of the wavelength division multiplexed signal lights being propagated in bi-directions through said plurality of optical transmission path being monitored by time-division.

18. A method of monitoring the quality of a wavelength division multiplexed signal light transmitted via an optical transmission path, comprising:
 selecting, as an object to be measured, a signal light of one wavelength from signal lights of a plurality of wavelengths;
 repeatedly measuring the frequency of occurrences of bit error in a previously set time for said selected signal light to be measured; and
 judging, based on said measurement results, whether or not said signal light to be measured is deteriorated in the quality thereof and a deterioration factor, wherein
 when it is judged that said signal light to be measured is deteriorated in the quality thereof, it is judged whether or not signal lights exist on wavelength grids adjacent to said signal light to be measured, and when the signal lights exist on the adjacent wavelength grids, the frequency of occurrences of bit error in the previously set time is repeatedly measured for the plurality of times for the signal lights on the adjacent grids, and the deterioration factor of said signal light to be measured is judged based on said measurement results.

* * * * *

UNITED STATES PATENT AND TRADEMARK OFFICE
CERTIFICATE OF CORRECTION

PATENT NO. : 7,400,830 B2
APPLICATION NO. : 10/806330
DATED : July 15, 2008
INVENTOR(S) : Kenichi Torii et al.

It is certified that error appears in the above-identified patent and that said Letters Patent is hereby corrected as shown below:

Column 16, Line 28, change "light:" to --light;--.

Column 19, Line 22, after "be" insert --measured;--.

Signed and Sealed this

Eighteenth Day of November, 2008

JON W. DUDAS
*Director of the United States Patent and Trademark Office*